(12) United States Patent
Nomura

(10) Patent No.: US 7,502,552 B2
(45) Date of Patent: Mar. 10, 2009

(54) IMAGING DEVICE

(75) Inventor: Hiroshi Nomura, Saitama (JP)

(73) Assignee: Hoya Corporation, Tokyo (JP)

( * ) Notice: Subject to any disclaimer, the term of this patent is extended or adjusted under 35 U.S.C. 154(b) by 342 days.

(21) Appl. No.: 11/289,556

(22) Filed: Nov. 30, 2005

(65) Prior Publication Data

US 2006/0115252 A1 Jun. 1, 2006

(30) Foreign Application Priority Data

Dec. 1, 2004 (JP) ............................ 2004-349184
Dec. 14, 2004 (JP) ............................ 2004-362034

(51) Int. Cl.
*G03B 17/04* (2006.01)

(52) U.S. Cl. ..................... 396/55; 396/349; 396/350

(58) Field of Classification Search ................... 396/55, 396/73–75, 349–350; 348/208.4–208.7, 348/208.11, 208.13, 360–361; 359/672, 359/821, 889

See application file for complete search history.

(56) References Cited

U.S. PATENT DOCUMENTS

| | | | | |
|---|---|---|---|---|
| 3,882,520 | A | * | 5/1975 | Kamp et al. ................... 396/73 |
| 4,768,048 | A | | 8/1988 | Wakabayashi |
| 4,887,107 | A | * | 12/1989 | Nakamura et al. ............. 396/75 |
| 5,416,558 | A | * | 5/1995 | Katayama et al. ............. 396/52 |
| 5,430,516 | A | | 7/1995 | Uziie et al. |
| 5,739,962 | A | | 4/1998 | Asakura et al. |
| 6,031,998 | A | * | 2/2000 | Shono .......................... 396/75 |
| 6,366,323 | B1 | | 4/2002 | Shono |
| 6,580,459 | B2 | * | 6/2003 | Uchino ........................ 348/342 |
| 6,978,088 | B2 | | 12/2005 | Nomura |
| 6,978,089 | B2 | | 12/2005 | Nomura et al. |
| 2003/0067544 | A1 | | 4/2003 | Wada |
| 2003/0156832 | A1 | * | 8/2003 | Nomura et al. ............... 396/72 |

FOREIGN PATENT DOCUMENTS

| | | |
|---|---|---|
| GB | 2394069 | 4/2004 |
| JP | 6-46314 | 2/1994 |

(Continued)

OTHER PUBLICATIONS

U.S. Appl. No. 11/289,557 to Nomura, filed Nov. 30, 2005.

(Continued)

*Primary Examiner*—W. B. Perkey
(74) *Attorney, Agent, or Firm*—Greenblum & Bernstein, P.L.C.

(57) ABSTRACT

An imaging device includes a radially-retracting device for moving a radially-retractable optical element, serving as part of a photographing optical system, between a photographing position on a common optical axis and a radially-retracted position; a biasing device for biasing the radially-retractable optical element toward the photographing position; a positioning device which determines a movement limit of the radially-retractable optical element in the biasing direction of the biasing device; and a sub-positioning device for positioning the radially-retractable optical element at the photographing position in a direction intersecting the driving direction of the radially-retracting device in a plane orthogonal to the common optical axis when the radially-retractable optical element is held at the photographing position by the positioning device, and for releasing the positioning of the radially-retractable optical element at the photographing position in the intersecting direction when the radially-retractable optical element is positioned at the radially-retracted position.

20 Claims, 29 Drawing Sheets

FOREIGN PATENT DOCUMENTS

| | | |
|---|---|---|
| JP | 2003-110928 | 4/2003 |
| JP | 2003-111449 | 4/2003 |
| JP | 2004-48266 | 2/2004 |

OTHER PUBLICATIONS

U.S. Appl. No. 11/289,478 to Nomura, filed Nov. 30, 2005.
U.S. Appl. No. 11/289,594 to Nomura, filed Nov. 30, 2005.
U.S. Appl. No. 11/289,560 to Nomura, filed Nov. 30, 2005.
U.S. Appl. No. 11/289,600 to Nomura, filed Nov. 30, 2005.
U.S. Appl. No. 11/289,602 to Nomura, filed Nov. 30, 2005.
U.S. Appl. No. 11/289,481 to Nomura, filed Nov. 30, 2005.
U.S. Appl. No. 11/289,558 to Nomura, filed Nov. 30, 2005.
U.S. Appl. No. 11/289,601 to Nomura, filed Nov. 30, 2005.
U.S. Appl. No. 11/289,739 to Nomura, filed Nov. 30, 2005.
English Abstract of JP 6-46314, Feb. 18, 1994.
English Abstract of JP2003-110928, Apr. 11, 2003.
English Abstract of JP2003-111449, Apr. 11, 2003.
English Abstract of JP2004-48266, Feb. 12, 2004.
Reissue U.S. Appl. Nos. 10/815,193 and 10/815,194, filed Apr. 1, 2004.

* cited by examiner

IMAGING DEVICE

BACKGROUND OF THE INVENTION

1. Field of the Invention

The present invention relates to an imaging device, more specifically relates to an imaging device having at least one optical element which moves in a direction non-parallel to a photographing optical axis.

2. Description of the Related Art

In a retractable type of photographic lens using no mirrors or prisms as refractors for refracting an optical axis of a photographing optical system (photographing optical axis), it is generally impossible to make the length of the photographic lens, in a retracted state, shorter than the sum of the thickness of the optical elements of the photographing optical system in the optical axis direction. Nevertheless, there has been a demand for a further reduction in length of the retracted photographic lens to achieve an extra-short photographic lens. As a solution to this demand, the assignee of the prevent invention has proposed a zoom lens whose length, in a retracted state, is further reduced by radially retracting a part of the photographing optical system away from the photographing optical axis thereof. This zoom lens is disclosed in United States Patent Publication No. US2003/0156832 A1.

In addition, an imaging device having an optical image stabilizer in which a part of a photographing optical system is moved in directions perpendicular to an optical axis of the photographing optical system to counteract image shake is known in the art.

In the imaging device, in which a part of a photographing optical system is retracted away from the photographing optical axis thereof, and the imaging device, in which a part of a photographing optical system is moved in directions perpendicular to an optical axis thereof to counteract image shake, an optical element of the photographing optical system moves in a direction non-parallel to the optical axis of the photographing optical system, and accordingly, such a movable optical element is required to be precisely positioned with a high degree of positioning accuracy so that the optical performance of the photographing optical system of the imaging device does not deteriorate due to improper positioning of the movable optical element.

SUMMARY OF THE INVENTION

The present invention provides an imaging device having at least one optical element which moves in a direction non-parallel to a photographing optical axis, wherein the positioning of this movable optical element can be made with a high degree of accuracy. Specifically, the present invention provides an imaging device in which a part of a photographing optical axis is retracted away from an optical axis thereof, wherein the positioning of this retractable optical part can be made with a high degree of accuracy in a photographic state of the imaging device.

According to an aspect of the present invention, an imaging device is provided, including a radially-retracting device for moving at least one radially-retractable optical element, serving as part of a photographing optical system, along a driving direction between a photographing position on a common optical axis of the photographing optical system and a radially-retracted position away from the common optical axis; a biasing device for biasing the radially-retractable optical element in a direction toward the photographing position; a positioning device which determines a limit of movement of the radially-retractable optical element in the biasing direction of the biasing device; and a sub-positioning device for positioning the radially-retractable optical element at the photographing position in a direction intersecting the driving direction of the radially-retracting device in a plane orthogonal to the common optical axis when the radially-retractable optical element is held at the photographing position by the positioning device, and for releasing the positioning of the radially-retractable optical element at the photographing position in the intersecting direction when the radially-retractable optical element is positioned at the radially-retracted position.

It is desirable for the radially-retracting device to move the radially-retractable optical element linearly along a linear driving direction in the plane that is orthogonal to the common optical axis, and for the intersecting direction, in which the sub-positioning device positions the radially-retractable optical element at the photographing position, is substantially perpendicular to the linear driving direction.

It is desirable for the radially-retracting device to include a linear guide shaft extending in a direction perpendicular to the common optical axis; and a retractable moving frame which supports the radially-retractable optical element and is supported by the linear guide shaft to be slidable thereon. The positioning device includes a positioning member which comes in contact with the retractable moving frame to determine the limit of movement of the radially-retractable optical element which corresponds to the photographing position.

It is desirable for the positioning member to include a swingable lever pivoted about an axis parallel to the common optical axis.

It is desirable for the positioning member to include a stop pin parallel to the common optical axis.

It is desirable for the biasing device to include an extension coil spring which is extended in a direction parallel to the linear guide shaft.

It is desirable for a contacting portion of the positioning member which comes in contact with the retractable moving frame to include an inclined surface which is inclined to an axial direction of the linear guide shaft.

It is desirable for the sub-positioning device to include a sub-moving frame which holds the radially-retractable optical element and is supported by the retractable moving frame to be linearly movable in a direction substantially perpendicular to a direction of movement of the retractable moving frame; a second positioning member which is positioned off a moving path of the sub-moving frame when the radially-retractable optical element is positioned at the radially-retracted position, and is positioned on the moving path of the sub-moving frame to be in contact with the sub-moving frame when the radially-retractable optical element is positioned at the photographing position; and a second biasing device for biasing the sub-moving frame in a direction to come in contact with the second positioning member.

It is desirable for the second positioning member to include a swingable lever pivoted about the axis parallel to the common optical axis.

It is desirable for the sub-moving frame to include a positioning surface which is engaged with the second positioning member for positioning of the sub-moving frame when the radially-retractable optical element is positioned at the photographing position by the radially-retracting device; and an engageable guide surface which comes in contact with the second positioning member and moves the second positioning member in a direction opposite to a biasing direction of the second biasing device to engage the positioning surface and the second positioning member with each other when the radially-retractable optical element moves from the radially-retracted position to the photographing position by the radially-retracting device.

It is desirable for the positioning surface to be a flat surface parallel to the linear guide shaft.

It is desirable for the engageable guide surface to be communicatively connected to the positioning surface to be inclined relative to the positioning surface.

The second biasing device can be a spring installed between the retractable moving frame and the sub-moving frame.

The spring can be a compression coil spring.

It is desirable for the radially-retractable optical element to include an image sensor on which an object image is focused via the photographing optical system when the image sensor is positioned at the photographing position.

It is desirable for the radially-retractable optical element to include a rearmost lens group of the photographing optical system in front of the image sensor.

It is desirable for the imaging device to include a retractable zoom lens which is retracted to reduce the length of the zoom lens when not in use.

In an embodiment, an imaging device is provided, including a first drive device for moving at least one radially-retractable optical element, serving as part of a photographing optical system, along a driving direction between a photographing position on a common optical axis of the photographing optical system and a radially-retracted position away from the common optical axis; and a second drive device for moving the radially-retractable optical element in a direction intersecting the driving direction of the first drive device in a plane orthogonal to the common optical axis. The first drive device includes a first biasing device for biasing the radially-retractable optical element in a direction toward the photographing position, and a first positioning member which determines a limit of movement of the radially-retractable optical element in the biasing direction of the first biasing device. The second drive device includes a second positioning member which determines a limit of movement of the radially-retractable optical element in a direction of movement of the radially-retractable optical element by the second drive device, and a second biasing device for biasing the radially-retractable optical element toward the limit of movement of the radially-retractable optical element in the direction of movement of the radially-retractable optical element by the second drive device. The second positioning member positions the radially-retractable optical element at the photographing position when the radially-retractable optical element is held at the photographing position by the first positioning member, and releases the positioning of the radially-retractable optical element when the radially-retractable optical element is disengaged from the first positioning member to be positioned at the radially-retracted position.

In an embodiment, an imaging device is provided, including a first moving frame supported by a guide member to be movable in a first direction non-parallel to a photographing optical axis of a photographing optical system; a second moving frame which holds at least a part of the photographing optical system and is supported by the first moving frame to be movable in a second direction non-parallel to the photographing optical axis and intersecting the first direction; a positioning member which determines a position of the second moving frame in the second direction when the first moving frame is positioned at a predetermined position in the first direction; and a biasing device, positioned between the first moving frame and the second moving frame, for biasing the second moving frame in a direction to bring the second moving frame to come in contact with the positioning member.

It is desirable for the positioning member to be movable in the second direction.

It is desirable for the first direction and the second direction to be perpendicular to each other in a plane orthogonal to the photographing optical axis.

According to the present invention, since the radially-retractable optical element is biased to move in a direction toward the photographing position from the radially-retracted position and since the limit of movement of the radially-retractable optical element in this biasing direction is determined by the positioning member to determine the photographing position of the radially-retractable optical element, it is possible for the radially-retractable optical element to be reliably held at the photographing position. Moreover, in this positioning of the radially-retractable optical element by the positioning member, the positioning of the radially-retractable optical element in another direction intersecting the direction of the retracting movement of the radially-retractable optical element in a plane orthogonal to the common optical axis is carried out by another positioning member, which makes it possible to eliminate backlash in the radially-retracting mechanism, thus making it possible to hold the radially-retractable optical element at the photographing position with a higher degree of precision.

Furthermore, in an imaging device having an optical element movable in two different directions relative to a photographing optical axis, this movable optical element can be positioned with a high degree of precision by a simple mechanism because backlash between the first moving frame and the second moving frame can be eliminated by a biasing device for biasing the second moving frame.

The present disclosure relates to subject matter contained in Japanese Patent Applications No. 2004-349184 (filed on Dec. 1, 2004), and No. 2004-362034 (filed on Dec. 14, 2004), which are expressly incorporated herein by reference in its entirety.

BRIEF DESCRIPTION OF THE DRAWINGS

The present invention will be described below in detail with reference to the accompanying drawings in which.

The present invention will be described below in detail with reference to the accompanying drawings in which.

DESCRIPTION OF THE PREFERRED EMBODIMENTS

Figure 1:
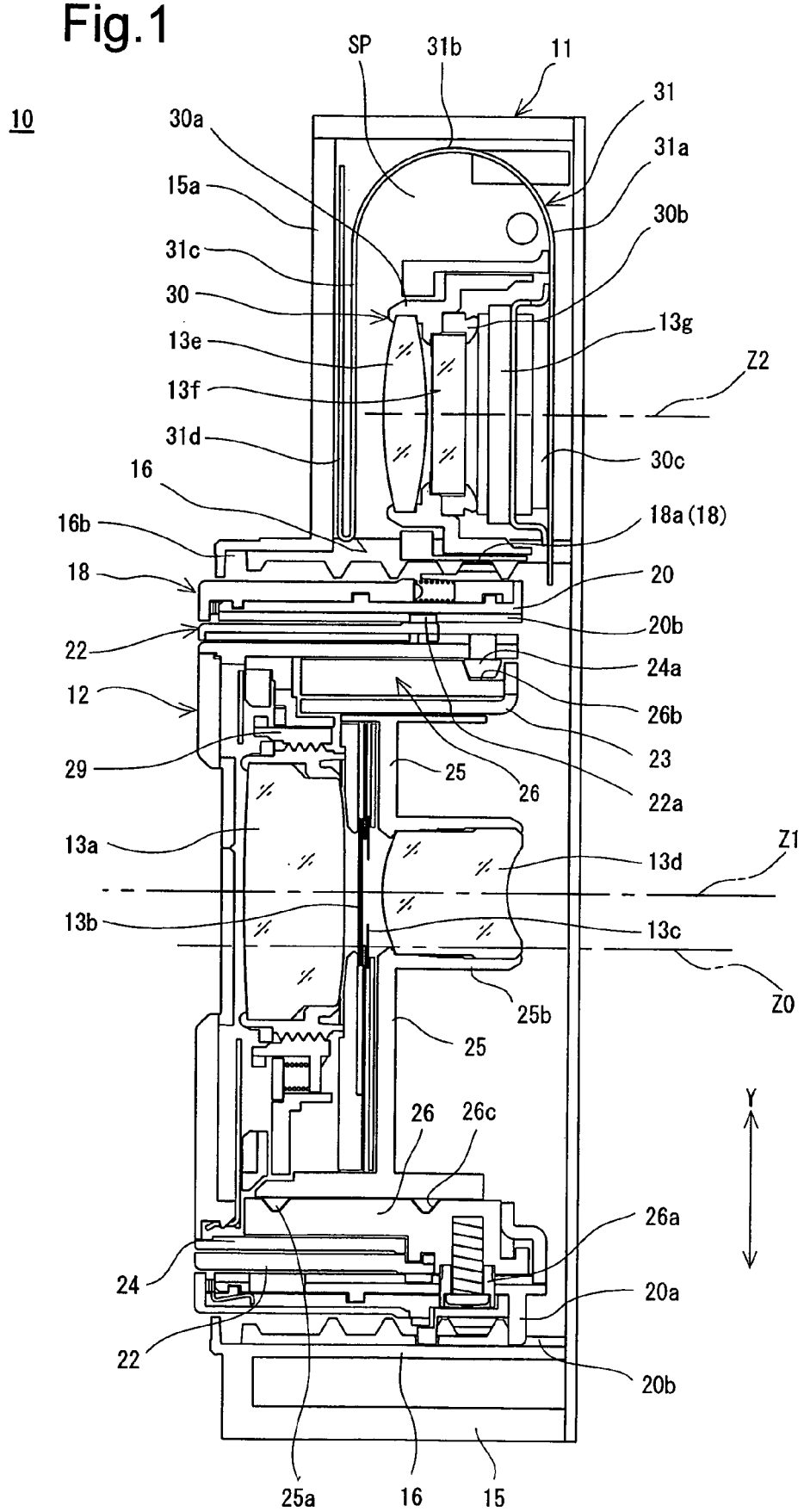
FIG. 1 is a cross-sectional view of an embodiment of a retractable zoom lens to which the present invention is applied in the retracted state of the zoom lens barrel.
Figure 2:
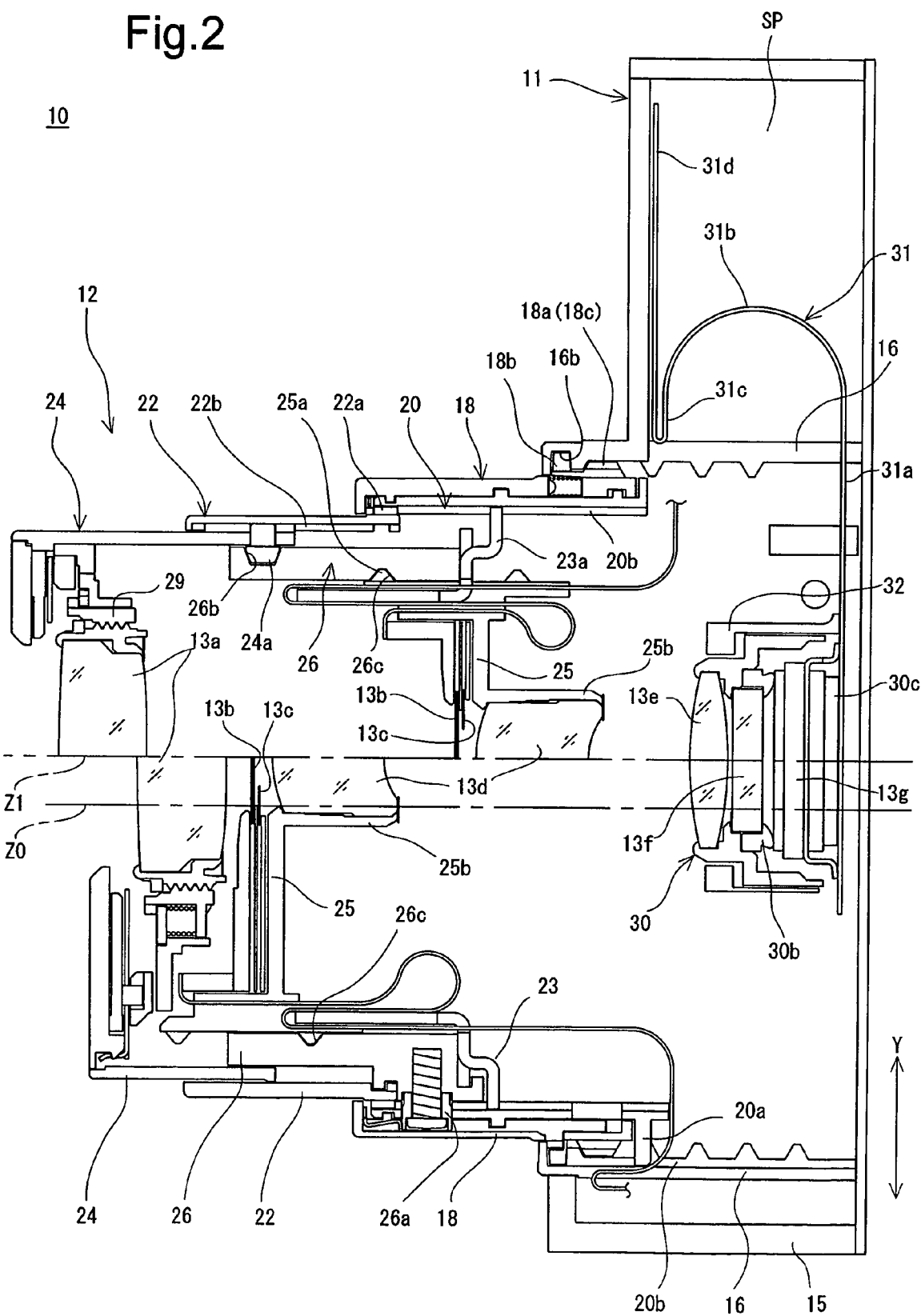
FIG. 2 is a cross-sectional view of the zoom lens shown in FIG. 1 in a photographic state of the zoom lens.
Figure 5:
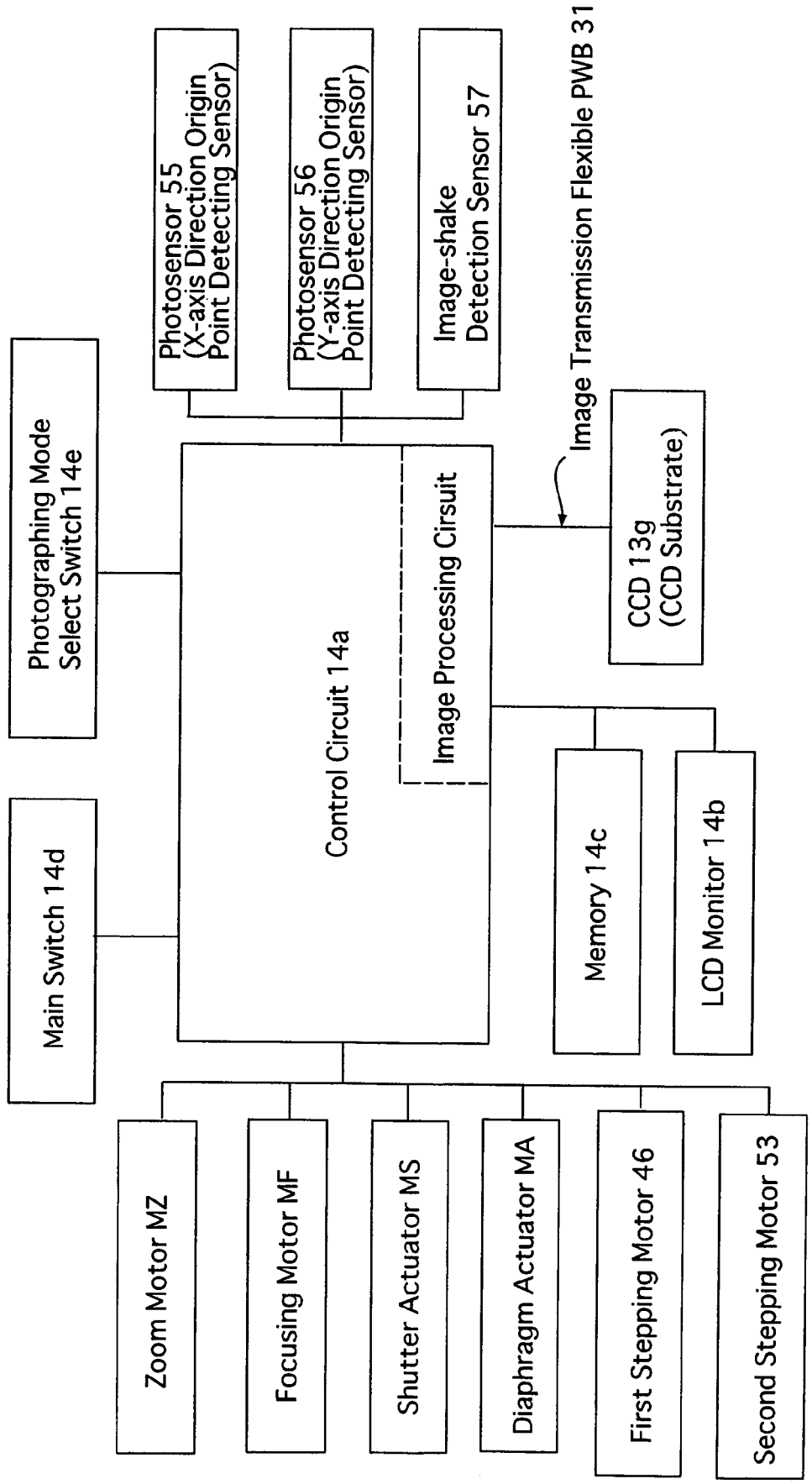
FIG. 5 is a block diagram illustrating a configuration of electrical circuits of a camera equipped with the zoom lens shown in FIGS. 1 and 2.

FIGS. 1 and 2 show cross-sections of a zoom lens 10 which is incorporated in a zoom lens camera. The zoom lens 10 is provided with a box-shaped housing 11 and a retractable barrel portion 12 retractably supported inside the housing 11. The outside of the housing 11 is covered by exterior components of the camera; the exterior components are not shown in the drawings. A photographing optical system of the zoom lens 10 includes a first lens group 13a, a shutter 13b, a diaphragm 13c, a second lens group 13d, a third lens group 13e, a low-pass filter 13f, and a CCD image sensor 13g (hereinafter referred to as CCD), in that order from the object side (the left side as viewed in FIGS. 1 and 2). As shown in FIG. 5, the CCD 13g is electrically connected to a control circuit 14a having an image processing circuit. Thus, an electronic image can be displayed on an LCD monitor 14b provided on an outer surface of the camera, and the electronic image data can be recorded in a memory 14c. In a photographic state (ready-to-photograph state) of the zoom lens 10 shown in FIG. 2, all of the optical elements constituting the photographing optical system are aligned on the same photographing optical axis Z1. On the other hand, in an accommodated (radially retracted) state of the zoom lens 10 shown in FIG. 1, the third lens group 13e, the low-pass filter 13f and the CCD 13g are moved away from the photographing optical axis Z1 to be radially retracted upward in the housing 11, and the second lens group 13d is linearly retracted into the space created as a result of the upward radial retracting movement of the third lens group 13e, the low-pass filter 13f and the CCD 13g, which reduces the length of the zoom lens 10 in the retracted state thereof. The overall structure of the zoom lens 10 that includes a radially-retracting mechanism for radially retracting optical elements upward will be described hereinafter. In the following description, the vertical direction and the horizontal direction of the zoom lens camera body equipped with the zoom lens 10 as viewed from the front thereof are defined as a y-axis and an x-axis, respectively.

The housing 11 is provided with a hollow box-shaped portion 15 and a hollow fixed ring portion 16 which is formed on a front wall 15a of the box-shaped portion 15 so as to enclose the photographing optical system about the photographing optical axis Z1. A rotation center axis Z0 serving as the center of the fixed ring portion 16 is parallel to the photographing optical axis Z1 and eccentrically located below the photographing optical axis Z1. A retraction space (accommodation space) SP (FIGS. 1 and 2) is formed inside the box-shaped portion 15 and above the fixed ring portion 16.

Figure 8:
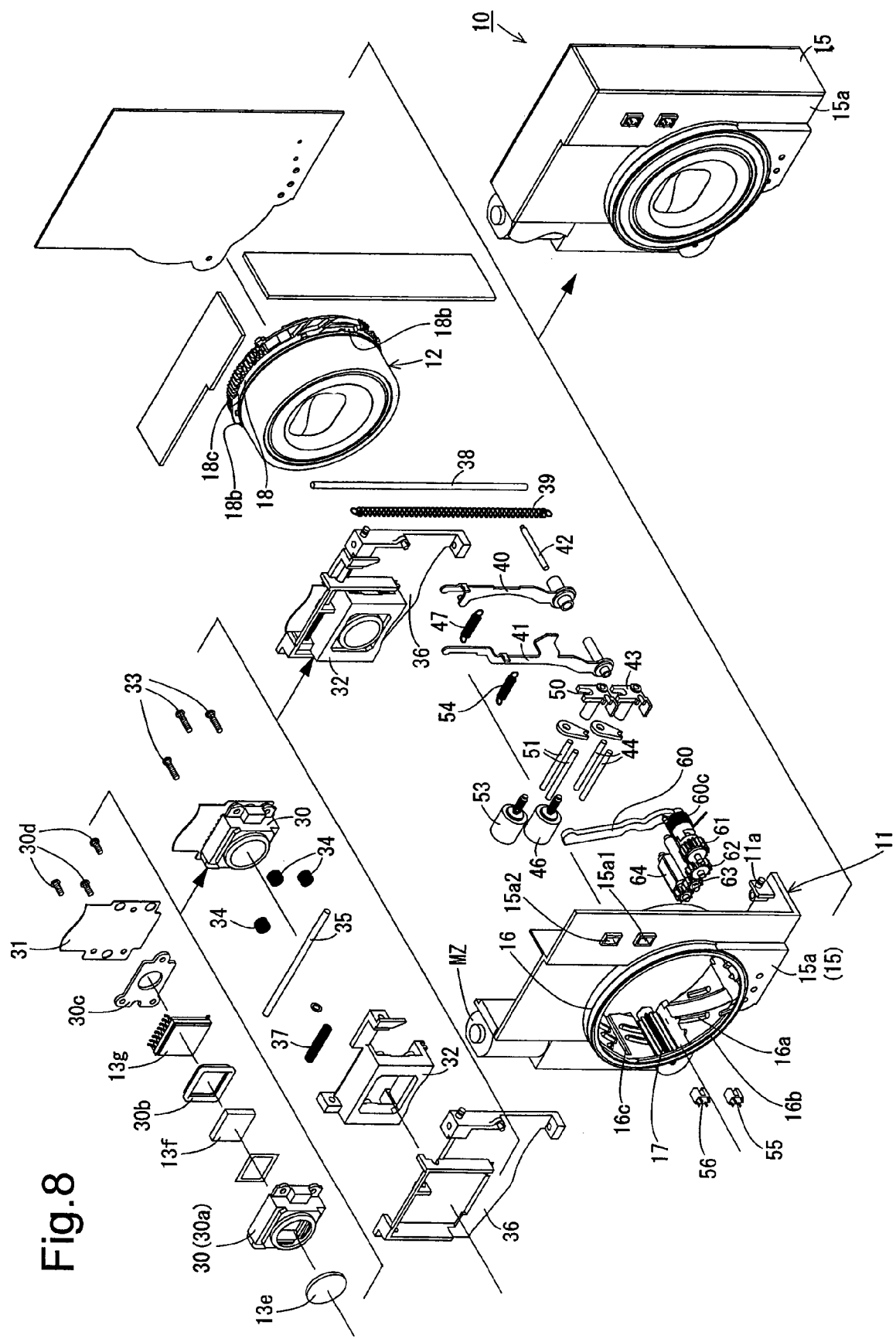
FIG. 8 is an exploded perspective view of the zoom lens shown in FIGS. 1 and 2.

A zoom gear 17 (FIGS. 8, 10 and 11) is supported on an inner peripheral surface side of the fixed ring portion 16 to be rotatable on an axis of rotation parallel to the rotation center axis Z0. The zoom gear 17 is rotated forward and reverse by a zoom motor MZ (FIGS. 5, 10, and 11) supported by the housing 11. In addition, the fixed ring portion 16 is provided on an inner peripheral surface thereof with a female helicoid 16a, a circumferential groove 16b and a plurality of linear guide grooves 16c (only one of them is shown in FIG. 8). The circumferential groove 16b is an annular groove with its center on the rotation center axis Z0, while the plurality of the linear guide grooves 16c are parallel to the rotation center axis Z0 (see FIGS. 3, 4 and 8).

Figure 10:
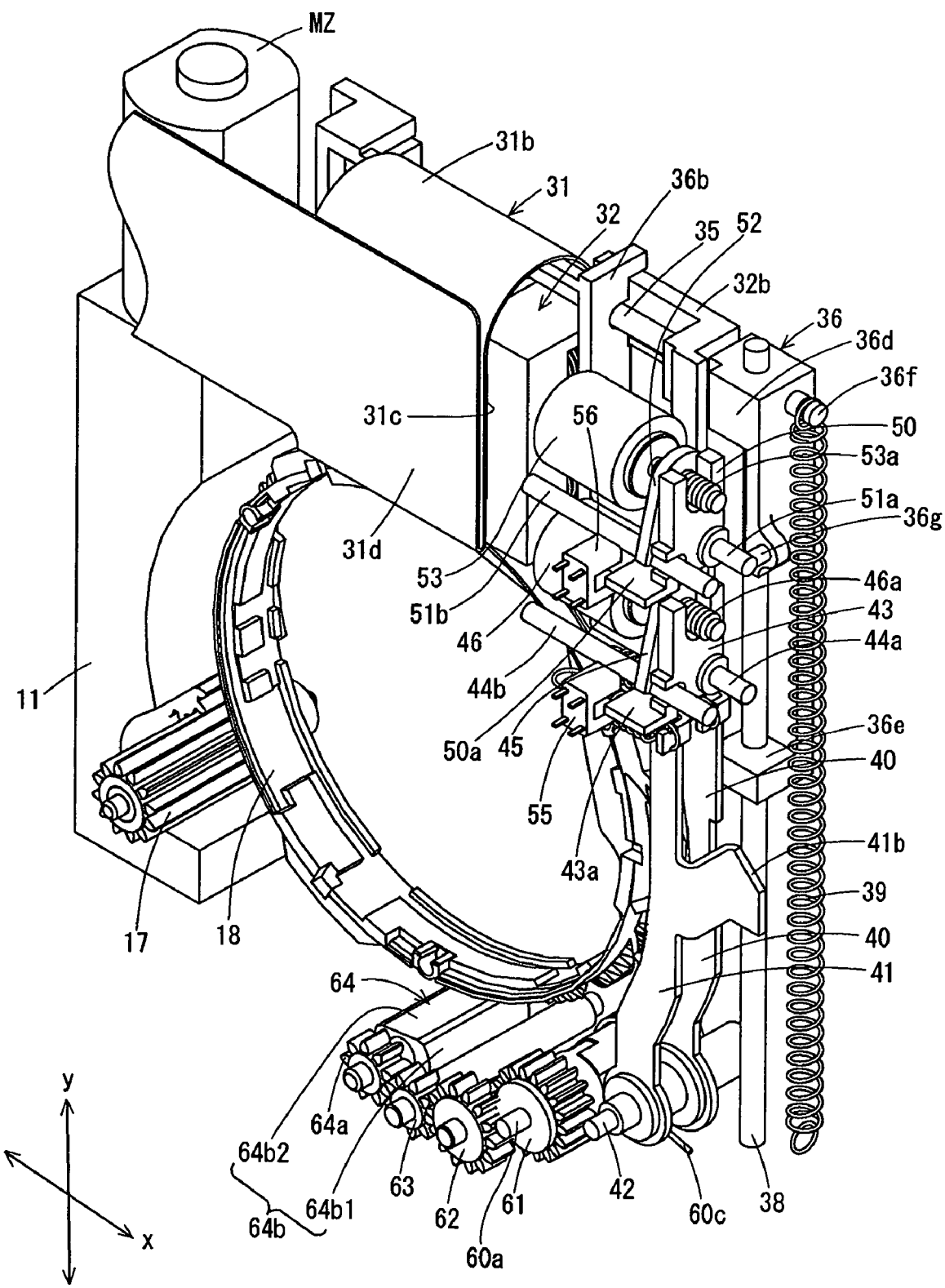
FIG. 10 is a front perspective view of the image stabilizing mechanism and the radially-retracting mechanism, illustrating the retracted state of a CCD holder in the retracted state of the zoom lens shown in FIG. 1.
Figure 11:
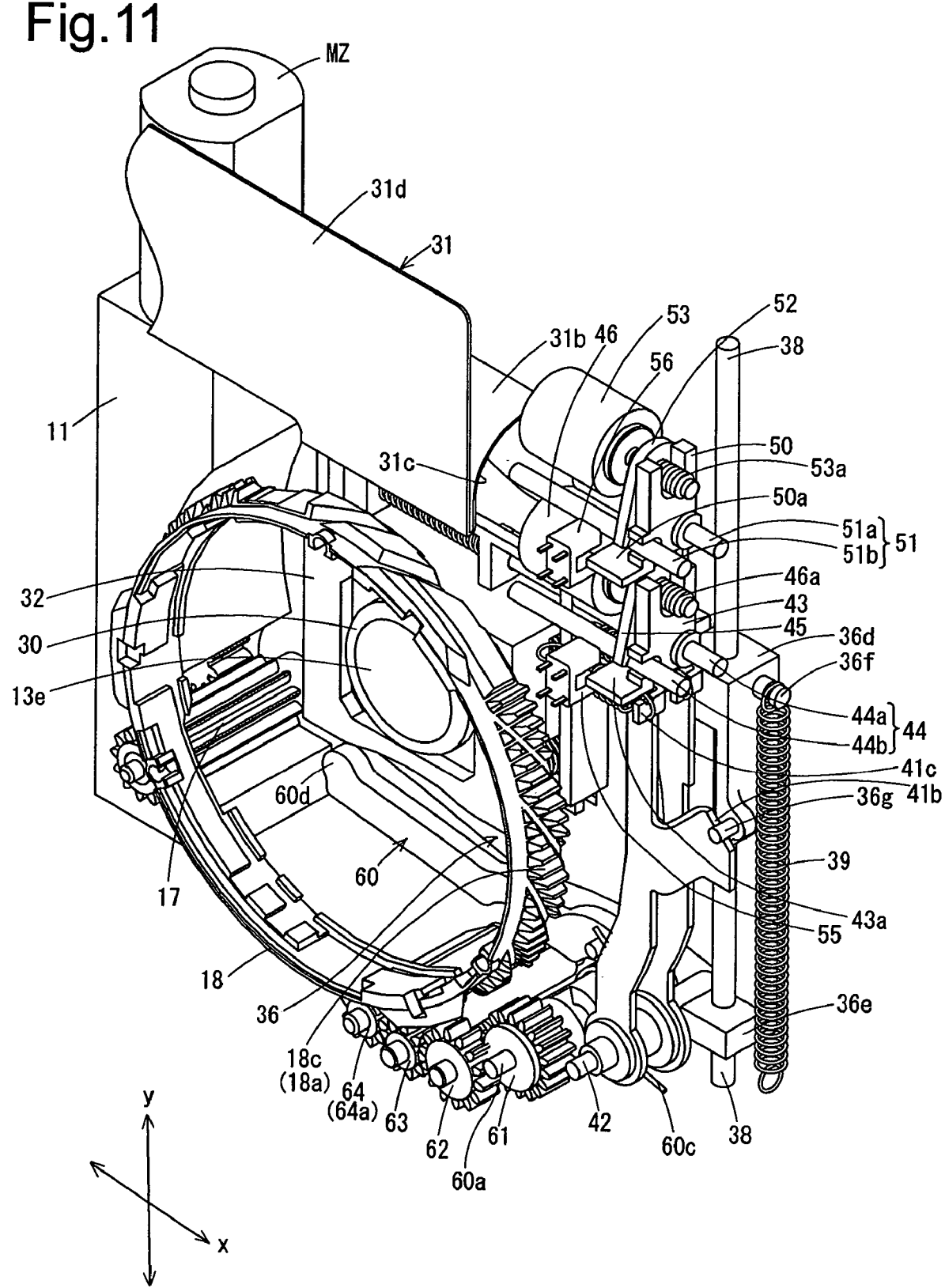
FIG. 11 is a front perspective view of the image stabilizing mechanism and the radially-retracting mechanism, illustrating the optical-axis advanced state of the CCD holder in a photographic state of the zoom lens.

A helicoid ring 18 is supported inside the fixed ring portion 16 to be rotatable about the rotation center axis Z0. The helicoid ring 18 is provided with a male helicoid 18a which is engaged with the female helicoid 16a of the fixed ring portion 16 and thus can advance and retract in the optical axis direction while rotating due to the engagement of the female helicoid 16a with the male helicoid 18a. The helicoid ring 18 is further provided, on an outer peripheral surface thereof in front of the female helicoid 18a, with a plurality of rotation guiding protrusions 18b (only two of them are shown in FIG. 8). In a state shown in FIGS. 2 through 4 in which the helicoid ring 18 advances to the frontmost position thereof with respect to the fixed ring portion 16, the female helicoid 16a and the male helicoid 18a are disengaged from each other while the plurality of rotation guiding protrusions 18b are slidably fitted in the circumferential groove 16b so that the helicoid ring 18 is prevented from further moving in the optical axis direction and is allowed only to rotate at a fixed position in the optical axis direction. The helicoid ring 18 is further provided on threads of the male helicoid 18a with an annular spur gear 18c which is in mesh with the zoom gear 17. Teeth of the spur gear 18c are aligned parallel to the photographing optical axis Z1. The zoom gear 17 is elongated in the axial direction thereof so as to remain engaged with the spur gear 18c at all times over the entire range of movement of the helicoid ring 18 from a retracted state of the helicoid ring 18 shown in FIGS. 1 and 10 to an extended state of the helicoid ring 18 shown in FIGS. 2 and 11. The helicoid ring 18 is constructed by combining two ring members which are splittable in the optical axis direction. In FIGS. 10 and 11, only the rear ring member of the helicoid ring 18 is shown.

Figure 3:
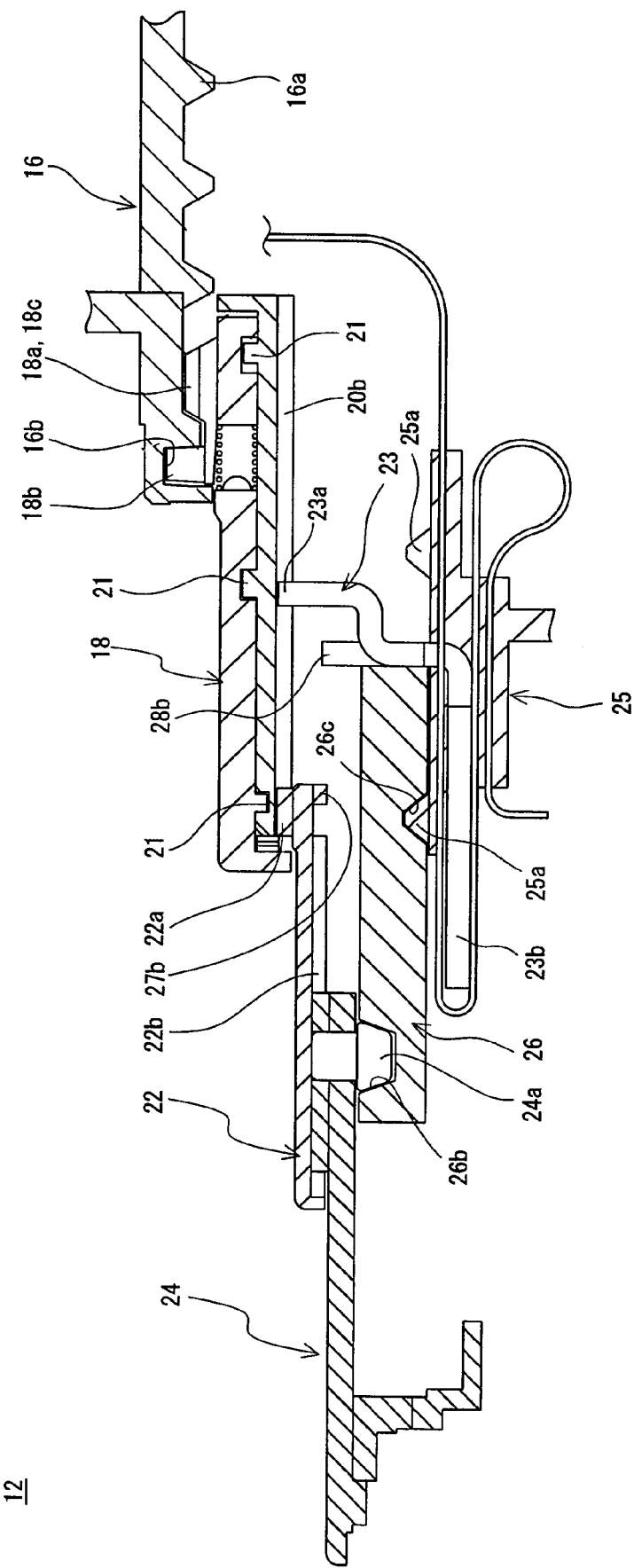
FIG. 3 is an enlarged cross-sectional view of a part of the zoom lens at the wide-angle extremity thereof.
Figure 4:
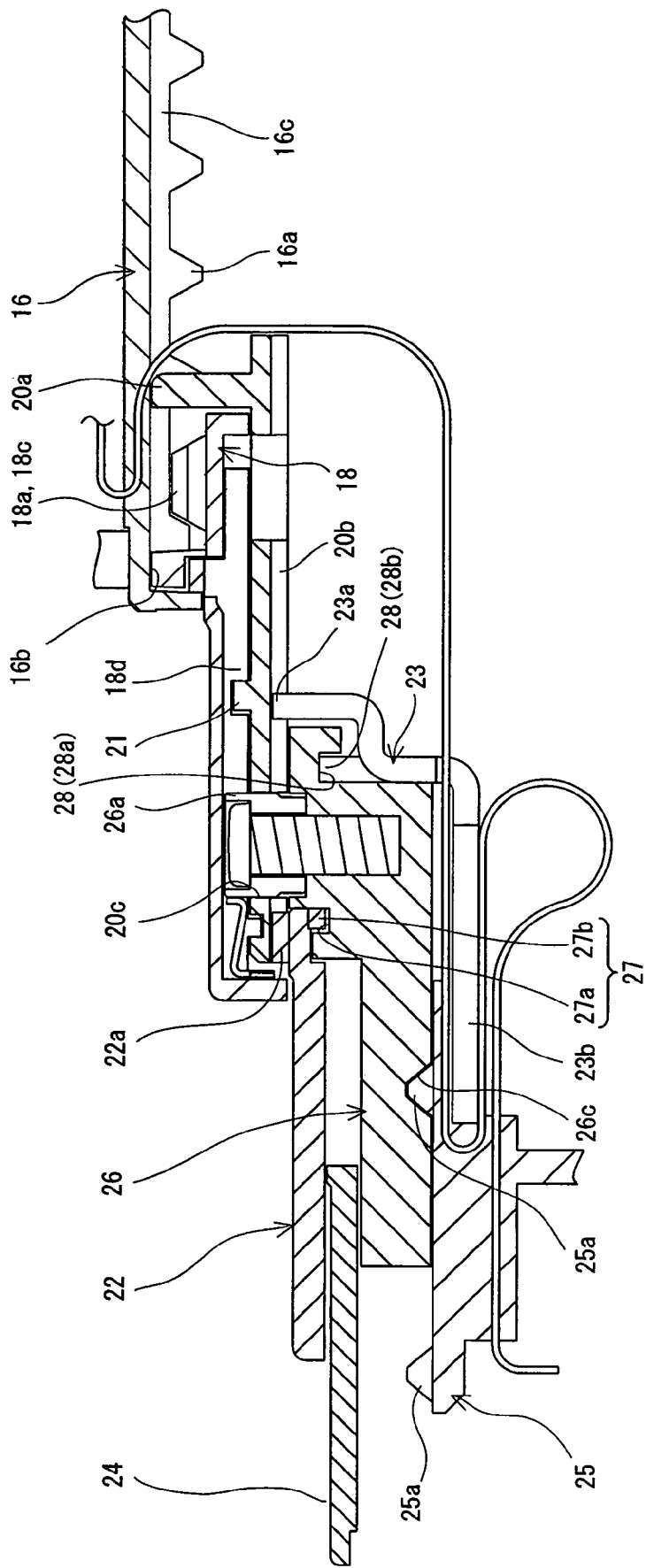
FIG. 4 is an enlarged cross-sectional view of a part of the zoom lens at the telephoto extremity thereof.

A linear guide ring 20 is supported inside the helicoid ring 18. The linear guide ring 20 is provided in the vicinity of the rear end thereof with a linear guide projection 20a, and is guided linearly along the rotation center axis Z0 (and the photographing optical axis Z1) by the slidable engagement of the linear guide projection 20a with the linear guide groove 16c of the fixed ring portion 16 as shown in FIG. 4. A rotation guiding portion 21 is provided between the inner peripheral surface of the helicoid ring 18 and the outer peripheral surface of the linear guide ring 20. The helicoid ring 18 is supported by the linear guide ring 20 to be rotatable with respect to the linear guide ring 20 and to be movable together with the linear guide ring 20 in the optical axis direction via the rotation guiding portion 21. The rotation guiding portion 21 consists of a plurality of circumferential grooves provided at different positions in the axial direction and radial protrusions, each of which is slidably engaged in the corresponding circumferential groove (see FIGS. 3 and 4).

The linear guide ring 20 is provided on an inner peripheral surface thereof with a plurality of linear guide grooves 20b (only one of them is shown in each of FIGS. 1 through 4) which extend parallel to the rotation center axis Z0 (and the photographing optical axis Z1). A plurality of linear guide projections 22a (only one of them is shown in each of FIGS. 1 through 4) which project radially outwards from a first lens group linear guide ring 22 and a plurality of linear guide projections 23a (only one of them is shown in each of FIGS. 1 through 4) which project radially outwards from a second lens group linear guide ring 23 are slidably engaged with the plurality of linear guide grooves 20b, respectively. The first lens group linear guide ring 22 guides a first lens group support frame 24 linearly in a direction parallel to the rotation center axis Z0 (and the photographing optical axis Z1) via a plurality of linear guide grooves 22b (only one of them is shown in each of FIGS. 2 and 3) formed on an inner peripheral surface of the first lens group linear guide ring 22. The second lens group linear guide ring 23 guides a second lens group support frame 25 linearly in a direction parallel to the rotation center axis Z0 (and the photographing optical axis Z1) via a plurality of linear guide keys 23b (only one of them is shown in each of FIGS. 1 through 4). The first lens group support frame 24 supports the first lens group 13a via a focusing frame 29, and the second lens group support frame 25 supports the second lens group 13d.

A cam ring 26 is provided inside the linear guide ring 20 to be rotatable about the rotation center axis Z0. The cam ring 26 is supported by the first lens group linear guide ring 22 and the second lens group linear guide ring 23 to be rotatable with respect to each of the first lens group linear guide ring 22 and the second lens group linear guide ring 23 and to movable in the optical axis direction together therewith via rotation guiding portions 27 and 28 (see FIG. 4). As shown in FIGS. 3 and 4, the rotation guiding portion 27 is composed of a discontinuous circumferential groove 27a (not shown in FIG. 3) which is formed on an outer peripheral surface of the cam ring 26, and an inner flange 27b which projects radially inwards from the first lens group linear guide ring 22 to be slidably engaged in the discontinuous circumferential groove 27a. As shown in FIGS. 3 and 4, the rotation guiding portion 28 is composed of a discontinuous circumferential groove 28a (not shown in FIG. 3) formed on an inner peripheral surface of the cam ring 26 and an outer flange 28b which projects radially outwards from the second lens group linear guide ring 23 to be slidably engaged in the discontinuous circumferential groove 28a.

As shown in FIG. 4, the cam ring 26 is provided thereon with a plurality of follower protrusions 26a (only one of them is shown in FIG. 4) which project radially outwards. The plurality of follower protrusions 26a passes through a plurality of follower guide slots 20c (only one of them is shown in FIG. 4) formed in the linear guide ring 20 to be engaged in a plurality of rotation transfer grooves 18d (only one of them is shown in FIG. 4) formed on an inner peripheral surface of the helicoid ring 18. Each rotation transfer groove 18d is parallel to the rotation center axis Z0 (and the photographing optical axis Z1), and each follower protrusion 26a is slidably engaged in the associated rotation transfer groove 18d to be prevented from moving in the circumferential direction relative to the associated rotation transfer groove 18d. Accordingly, the rotation of the helicoid ring 18 is transferred to the cam ring 26 via the engagement between the plurality of rotation transfer grooves 18d and the plurality of follower protrusions 26a. Although the development shape of each follower guide groove 20c is not shown in the drawings, each follower guide groove 20c is a guide groove including a circumferential groove portion with its center on the rotation center axis Z0 and an inclined lead groove portion parallel to the female helicoid 16a. Accordingly, when rotated by a rotation of the helicoid ring 18, the cam ring 26 rotates while moving forward or rearward along the rotation center axis Z0 (and the photographing optical axis Z1) if each follower protrusion 26a is engaged in the lead groove portion of the associated follower guide groove 20c, and rotates at a fixed position in the optical axis direction without moving forward or rearward if each follower protrusion 26a is engaged in the circumferential groove portion of the associated follower guide groove 20c.

The cam ring 26 is a double-sided cam ring having a plurality of outer cam grooves 26b (only one of them is shown in FIG. 3) and a plurality of inner cam grooves 26c (only one of them is shown in each of FIGS. 3 and 4) on outer and inner peripheral surfaces of the cam ring 26, respectively. The plurality of outer cam grooves 26b are slidably engaged with a plurality of cam followers 24a (only one of them is shown in FIG. 3) which project radially inwards from the first lens group support frame 24, respectively, while the plurality of inner cam grooves 26c are slidably engaged with a plurality of cam followers 25a (only one of them is shown in each of FIGS. 3 and 4) which project radially outwards from the second lens group support frame 25. Accordingly, when the cam ring 26 is rotated, the first lens group support frame 24 that is guided linearly in the optical axis direction by the first lens group linear guide ring 22 moves forward and rearward along the rotation center axis Z0 (and the photographing optical axis Z1) in predetermined motion in accordance with contours of the plurality of outer cam grooves 26b likewise, when the cam ring 26 is rotated, the second lens group support frame 25 that is guided linearly in the optical axis direction by the second lens group linear guide ring 23 moves forward and rearward along the rotation center axis Z0 (and the photographing optical axis Z1) in predetermined motion in accordance with contours of the plurality of the plurality of inner cam grooves 26c.

The second lens group support frame 25 is provided with a cylindrical portion 25b (see FIGS. 1 and 2) which holds the second lens group 13d, and supports the shutter 13b and the diaphragm 13c in front of the cylindrical portion 25b to allow each of the shutter 13b and the diaphragm 13c to be opened and closed. The shutter 13b and the diaphragm 13c can be opened and closed by a shutter actuator MS and a diaphragm actuator MA, respectively, which are supported by the second lens group support frame 25 (see FIGS. 5 and 15).

The focusing frame 29 which holds the first lens group 13a is supported by the first lens group support frame 24 to be movable along the rotation center axis Z0 (and the photographing optical axis Z1). The focusing frame 29 can be moved forward and rearward by a focusing motor MF (see FIG. 5).

The operation of each of the zoom motor MZ, the shutter actuator MS, the diaphragm actuator MA and the focusing motor MF is controlled by the control circuit 14a. Upon turning on a main switch 14d (see FIG. 5) of the camera, the zoom motor MZ is driven to bring the zoom lens 10 to the photographic state shown in FIG. 2. Upon turning off the main switch 14d, the zoom lens 10 is moved from the photographic state to the retracted state shown in FIG. 1.

The above described operation of the zoom lens 10 is summarized as follows. Upon turning on the main switch 14d in the retracted state of the zoom lens 10 shown in FIG. 1, the zoom gear 17 is driven to rotate in a lens barrel advancing direction. Accordingly, the helicoid ring 18 moves forward in the optical axis direction while rotating, and simultaneously, the linear guide ring 20 linearly moves forward in the optical axis direction together with the helicoid ring 18. In addition, the rotation of the helicoid ring 18 causes the cam ring 26 to move forward in the optical axis direction while rotating relative to the linear guide ring 20. The first lens group linear guide ring 22 and the second lens group linear guide ring 23 linearly move forward in the optical axis direction together with the cam ring 26. Each of the first lens group support frame 24 and the second lens group support frame 25 moves in the optical axis direction relative to the cam ring 26 in predetermined motion. Therefore, the moving amount of the first lens group 13a in the optical axis direction when the zoom lens 10 is extended from the retracted state thereof is determined by adding the moving amount of the cam ring 26 relative to the fixed ring portion 16 to the moving amount of the first lens group support frame 24 relative to the cam ring 26 (the advancing/retracting amount of the first lens group support frame 24 by the cam groove 26b). Furthermore, the moving amount of the second lens group 13d in the optical axis direction when the zoom lens 10 is extended from the retracted state thereof is determined by adding the moving amount of the cam ring 26 relative to the fixed ring portion 16 to the moving amount of the second lens group support frame 25 relative to the cam ring 26 (the advancing/retracting amount of the second lens group support frame 25 by the cam groove 26c).

Figure 6:
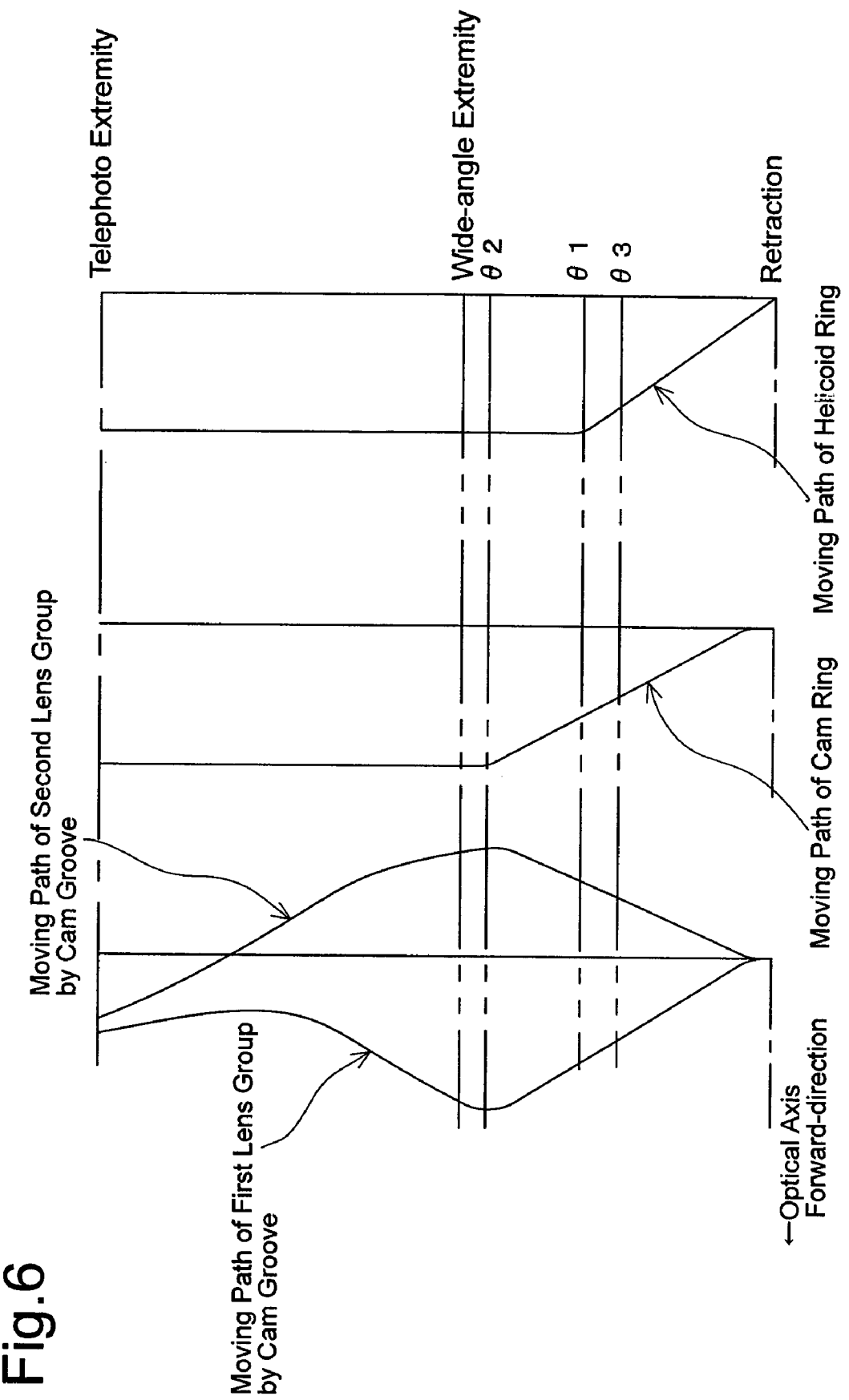
FIG. 6 is a conceptual diagram showing the moving paths of a helicoid ring and a cam ring and the moving paths of a first lens group and a second lens group by movement of the cam ring.
Figure 7:
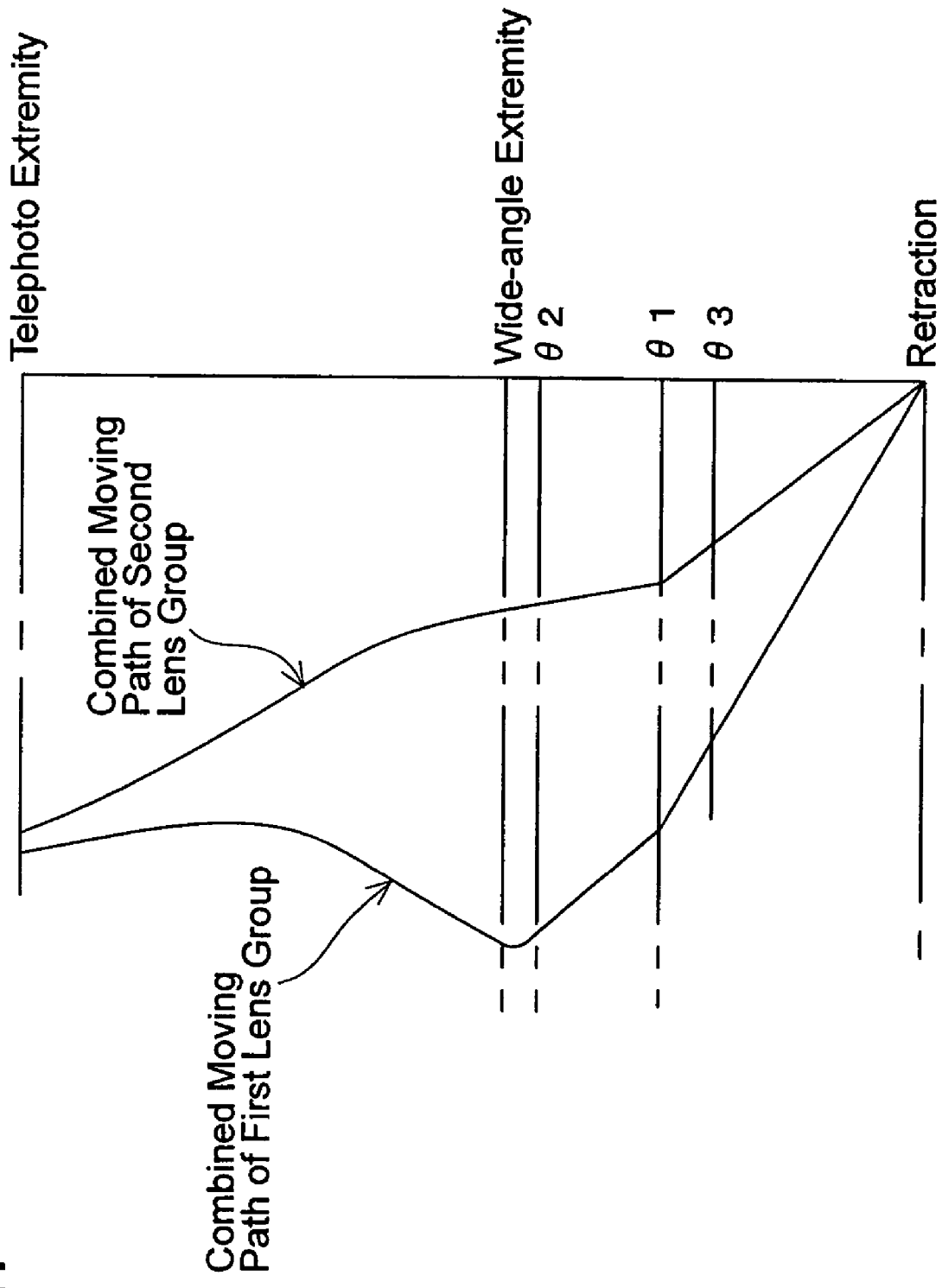
FIG. 7 is a conceptual diagram showing the combined moving path of each of the first lens group and the second lens group, in which the moving paths of the helicoid ring and the cam ring are included.

FIG. 6 shows the moving paths of the helicoid ring 18 and the cam ring 26 and the moving paths of the first lens group 13a and the second lens group 13d relative to the cam ring 26 (the cam diagrams of the cam grooves 26b and 26c). The vertical axis represents the amount of rotation (angular position) of the lens barrel from the retracted state of the zoom lens 10 to the telephoto extremity thereof, and the horizontal axis represents the amount of movement of the lens barrel in the optical axis direction. As shown in FIG. 6, the helicoid ring 18 is moved forward in the optical axis direction while rotating up to an angular position $\theta 1$ which is located at about the midpoint in the range of extension of the zoom lens 10 from the retracted position (shown in FIG. 1) to the wide-angle extremity (shown by the upper half of the zoom lens 10 from the photographing optical axis Z1 and shown in FIG. 2), whereas the helicoid ring 18 rotates at a fixed position in the optical axis direction as described above in the range of extension of the zoom lens 10 from the angular position $\theta 1$ to the telephoto extremity (shown by the lower half of the zoom lens 10 from the photographing optical axis Z1 and shown in FIG. 4). On the other hand, the cam ring 26 is moved forward in the optical axis direction while rotating up to an angular position $\theta 2$ which is located immediately behind the wide-angle extremity of the zoom lens 10 in the range of extension of the zoom lens 10 from the retracted position to the wide-angle extremity, whereas the cam ring 26 rotates at a fixed position in the optical axis direction as described above in the range of extension of the zoom lens 10 from the angular position $\theta 2$ to the telephoto extremity, similar to the helicoid ring 18. In the zooming range from the wide-angle extremity to the telephoto-extremity, the moving amount of the first lens group 13a in the optical axis direction is determined from the moving amount of the first lens group support frame 24 relative to the cam ring 26 which rotates at a fixed position in the optical axis direction (the advancing/retracting amount of the first lens group support frame 24 via the cam groove 26b), while the moving amount of the second lens group 13d in the optical axis direction is determined from the moving amount of the second lens group support frame 25 relative to the cam ring 26 which rotates at a fixed position in the optical axis direction (the advancing/retracting amount of the second lens group support frame 25 via the cam groove 26c). The focal length of the zoom lens 10 is varied by the relative movement in the optical axis direction between the first lens group 13a and the second lens group 13d. FIG. 7 shows the actual moving path of the first lens group 13a which is obtained by combining the moving amounts of the helicoid ring 18 and the cam ring 26 with the moving amount of the first lens group 13a by the cam groove 26b, and the actual moving path of the second lens group 13*d* which is obtained by combining the moving amounts of the helicoid ring 18 and the cam ring 26 with the moving amount by the cam groove 26*c*.

In the zooming range from the wide-angle extremity to the telephoto extremity, a focusing operation is performed by moving the first lens group 13*a* in the optical axis direction independently of other optical elements by the focusing motor MF.

The operations of the first lens group 13*a* and the second lens group 13*d* have been described above. In the zoom lens 10 of the present embodiment, the optical elements of the zoom lens 10 from the third lens group 13*e* to the CCD 13*g* are retractable away from the photographing position on the photographing optical axis Z1 to an off-optical-axis retracted position (radially retracted position) Z2 located above the photographing position as described above. In addition, by moving the optical elements from the third lens group 13*e* to the CCD 13*g* on a plane perpendicular to the photographing optical axis Z1, image shake can also be counteracted. The retracting mechanism and the image stabilizing mechanism will be discussed hereinafter.

Figure 18:
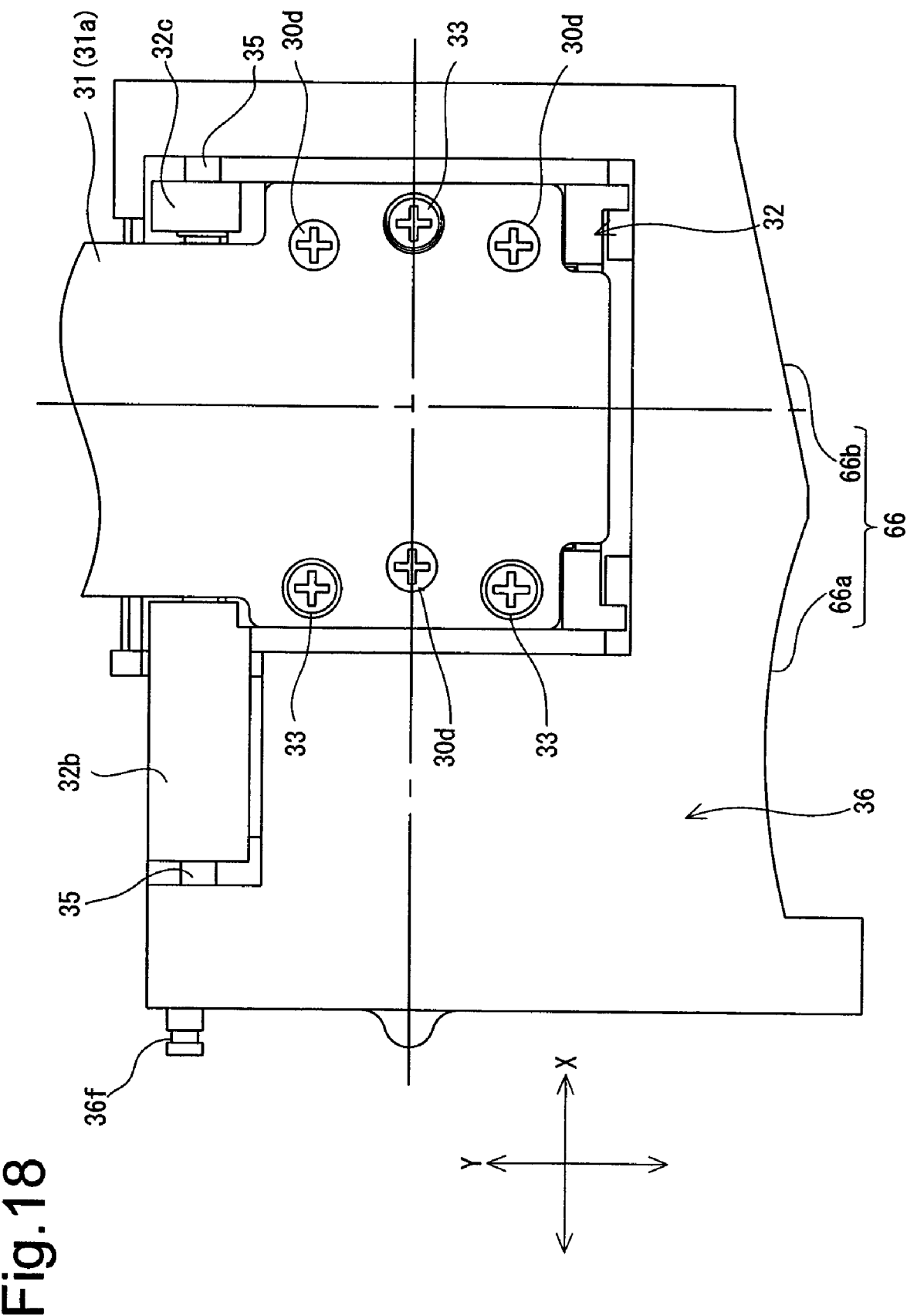
FIG. 18 is a rear view of the horizontal moving frame, the vertical moving frame and the associated elements shown in FIGS. 16 and 17.
Figure 19:
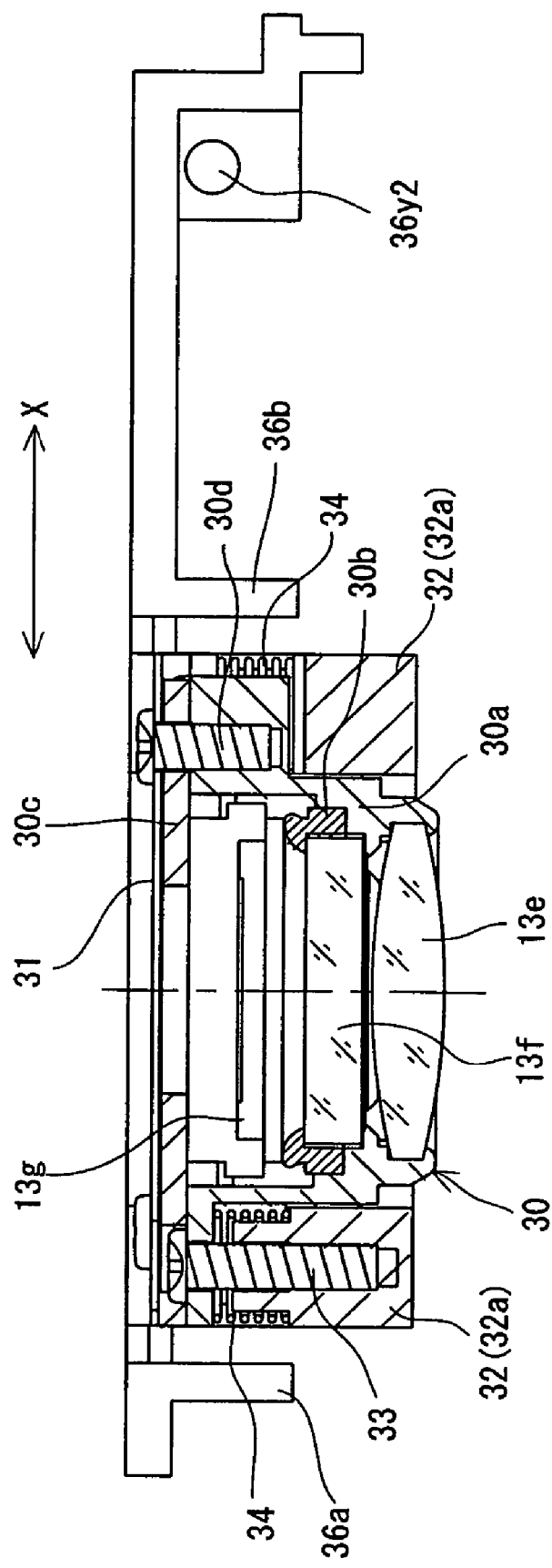
FIG. 19 is a cross-sectional view of the CCD holder, the horizontal moving frame, the vertical moving frame and other elements, taken along D1-D1 line shown in FIG. 17.

As shown in FIGS. 8 and 19, the third lens group 13*e*, the low-pass filter 13*f* and the CCD 13*g* are held by a CCD holder 30 to be provided as a unit. The CCD holder 30 is provided with a holder body 30*a*, a sealing member 30*b* and a pressure plate 30*c*. The third lens group 13*e* is held by the holder body 30*a* at a front end aperture thereof. The low-pass filter 13*f* is held between a flange formed on an inner surface of the holder body 30*a* and the sealing member 30*b*, and the CCD 13*g* is held between the sealing member 30*b* and the pressure plate 30*c*. The holder body 30*a* and the pressure plate 30*c* are fixed to each other by three fixing screws 30*d* (see FIGS. 15 and 18) separately arranged around the central axis of the CCD holder 30 (the photographing optical axis Z1 in a photographic state of the zoom lens 10). The three fixing screws 30*d* also secure one end portion of an image transmission flexible PWB 31 to the rear surface of the pressure plate 30*c* so that a supporting substrate of the CCD 13*g* is electrically connected to the image transmission flexible PWB 31.

The image transmission flexible PWB 31 extends from its connection end at the CCD 13*g* to the retraction space SP in the housing 11. The image transmission flexible PWB 31 is provided with a first linear portion 31*a*, a U-shaped portion 31*b*, a second linear portion 31*c*, and a third linear portion 31*d* (see FIGS. 1 and 2). The first linear portion 31*a* is substantially orthogonal to the photographing optical axis Z1 and extends upward. The U-shaped portion 31*b* is bent forward from the first linear portion 31*a*. The second linear portion 31*c* extends downward from the U-shaped portion 31*b*. The third linear portion 31*d* is folded upward from the second linear portion 31*c*. The third linear portion 31*d* is fixed to an inner surface of the front wall 15*a* of the housing 11 therealong. The first linear portion 31*a*, the U-shaped portion 31*b* and the second linear portion 31*c* (except the third linear portion 31*d*) serve as a free-deformable portion which is freely resiliently deformable according to the motion of the CCD holder 30.

The CCD holder 30 is supported by a horizontal moving frame (sub-moving frame/an element of a second driving device/second moving frame) 32 via three adjusting screws 33 (see FIGS. 15 and 18) separately arranged around the central axis of the CCD holder 30 (the photographing optical axis Z1 in a ready-photograph state of the zoom lens 10). Three compression coil springs 34 are installed between the CCD holder 30 and the horizontal moving frame 32. The shaft portions of the three adjusting screws 33 are inserted into the three compression coil springs 34, respectively. When the tightening amounts of the adjusting screws 33 are changed, the respective compression amounts of the coil springs 34 are changed. The adjusting screws 33 and the compression coil springs 34 are provided at three different positions around the optical axis of the third lens group 13*e*, and accordingly, the inclination of the CCD holder 30 with respect to the horizontal moving frame 32, or the inclination of the optical axis of the third lens group 13*e* with respect to the photographing optical axis Z1, can be adjusted by changing the tightening amounts of the three adjusting screws 33.

Figure 16:
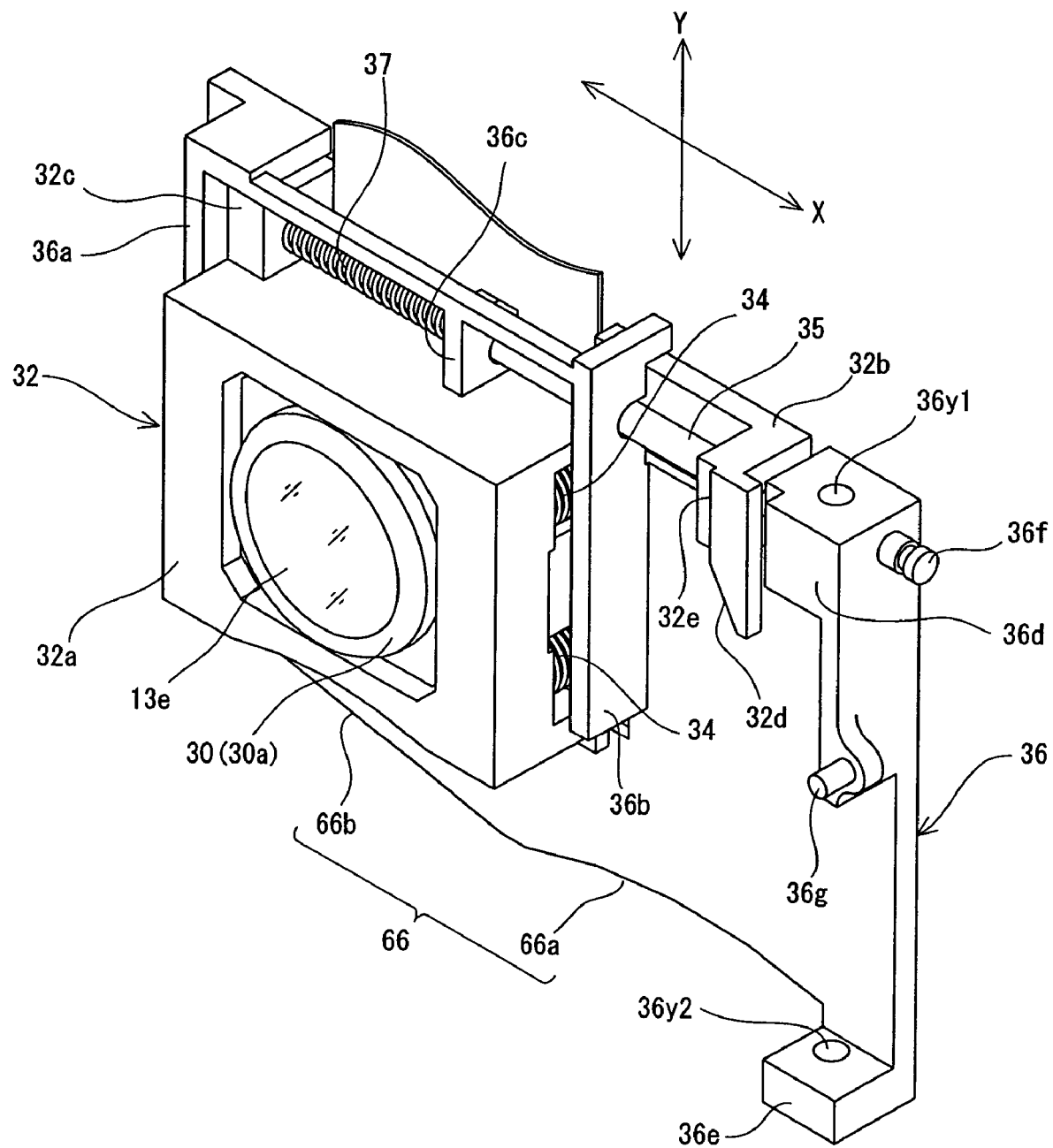
FIG. 16 is a front perspective view of a horizontal moving frame and a vertical moving frame which support the CCD holder, and associated elements.
Figure 17:
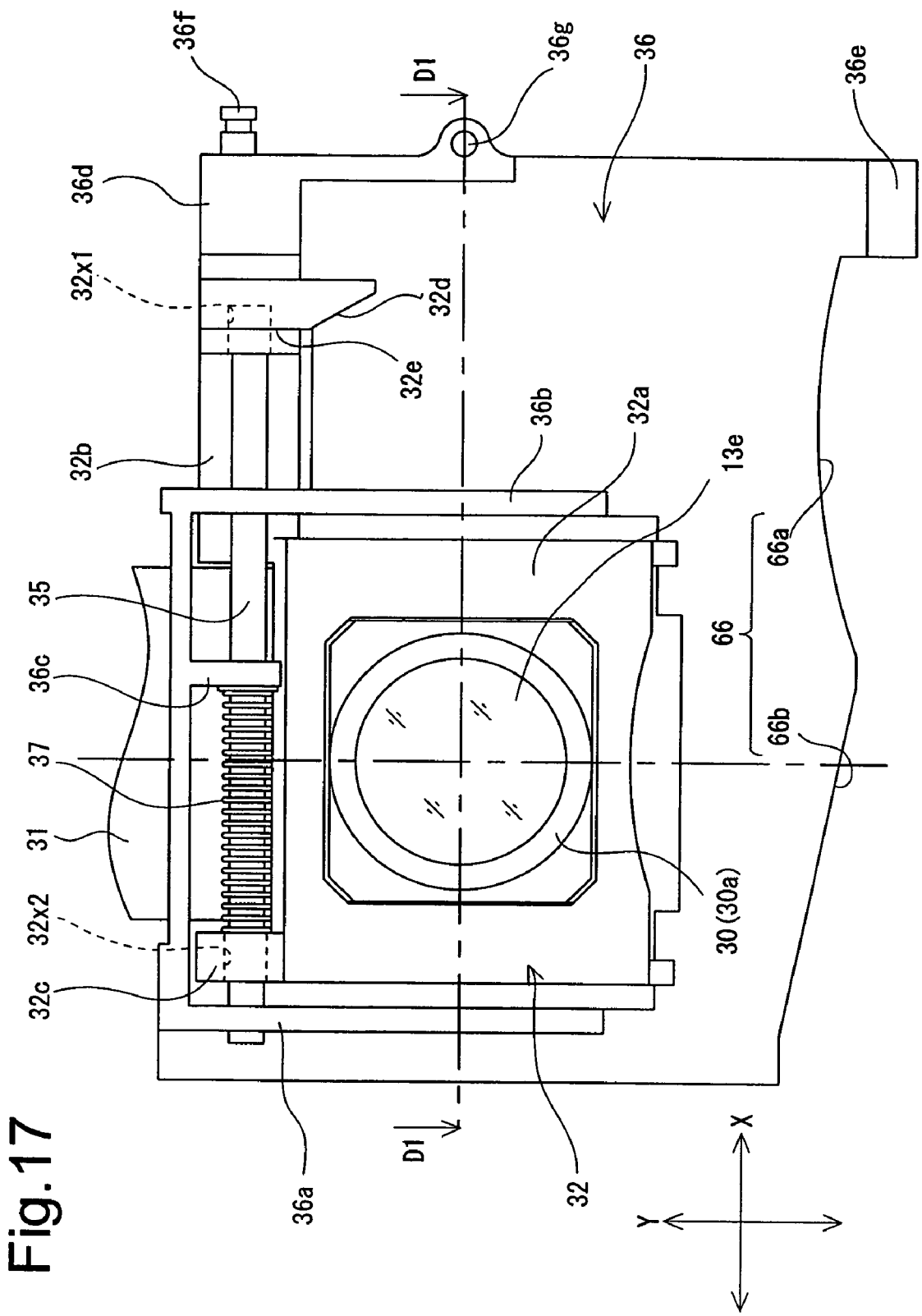
FIG. 17 is a front view of the horizontal moving frame, the vertical moving frame and the associated elements shown in FIG. 16.

As shown in FIG. 16, the horizontal moving frame 32 is supported by a vertical moving frame (radially-retracting device/retractable moving frame/an element of a first driving device/first moving frame) 36 to be movable with respect thereto via a horizontal guide shaft (an element of the second driving device) 35 extending in the x-axis direction. Specifically, the horizontal moving frame 32 is provided with a rectangular frame portion 32*a* which encloses the CCD holder 30 and an arm portion 32*b* which extends horizontally from the frame portion 32*a*. A spring supporting protrusion 32*c* is formed on an upper surface of the frame portion 32*a*, and an inclined surface (engageable guide surface) 32*d* and a position restricting surface (positioning surface) 32*e* are formed on an end portion of the arm portion 32*b*. The position restricting surface 32*e* is a flat surface parallel to the y-axis. On the other hand, the vertical moving frame 36 is provided with a pair of motion restricting frames 36*a* and 36*b*, a spring supporting portion 36*c*, an upper bearing portion 36*d*, and a lower bearing portion 36*e*. The pair of motion restricting frames 36*a* and 36*b* are provided spaced apart in the x-axis direction. The spring supporting portion 36*c* is located between the pair of the motion restricting frames 36*a* and 36*b*. The upper bearing portion 36*d* is located on a line extended from the spring supporting portion 36*c* in the x-axis direction. The lower bearing portion 36*e* is located below the upper bearing portion 36*d*. As shown in FIG. 17, the horizontal moving frame 32 is supported by the vertical moving frame 36 in a state where the frame portion 32*a* is positioned in the space between the pair of motion restricting frames 36*a* and 36*b* and where the inclined surface 32*d* and the position restricting surface 32*e* of the arm portion 32*b* are positioned between the motion restricting frame 36*b* and the upper bearing portion 36*d*.

One end of the horizontal guide shaft 35 is fixed to the motion restricting frame 36*a* of the vertical moving frame 36, and the other end of the horizontal guide shaft 35 is fixed to the upper bearing portion 36*d* of the vertical moving frame 36. Two through-holes are respectively formed in the motion restricting frame 36*b* and the spring supporting portion 36*c* to be horizontally aligned to each other so as to allow the horizontal guide shaft 35 to pass through the motion restricting frame 36*b* and the spring supporting portion 36*c*. Horizontal through-holes 32*x*1 and 32*x*2 (see FIG. 17) into which the horizontal guide shaft 35 is inserted are formed in the arm portion 32*b* and the spring supporting protrusion 32*c* of the horizontal moving frame 32, respectively. The horizontal through-holes 32*x*1 and 32*x*2 of the horizontal moving frame 32 and the aforementioned two through-holes which are respectively formed in the motion restricting frame 36*b* and the spring supporting portion 36*c* are horizontally aligned with each other. Since the horizontal guide shaft 35 is slidably fitted in the horizontal through-holes 32*x*1 and 32*x*2, the horizontal moving frame 32 is supported by the vertical moving frame 36 to be movable with respect to the vertical moving frame 36 in the x-axis direction. A horizontal moving frame biasing spring (an element of a sub-positioning device/biasing device) 37 is installed on the horizontal guide shaft 35 between the spring supporting protrusion 32c and the spring supporting portion 36c. The horizontal moving frame biasing spring 37 is a compression coil spring and biases the horizontal moving frame 32 in a direction (leftward as viewed in FIG. 17) to make the spring supporting protrusion 32c approach the motion restricting frame 36a.

Vertical through-holes 36y1 and 36y2 (see FIG. 16) are further formed in the upper bearing portion 36d and the lower bearing portion 36e of the vertical moving frame 36, respectively, which extend in a line along the y-axis direction which is orthogonal to the photographing optical axis Z1. The vertical through-hole 36y1 and the vertical through-hole 36y2 are vertically aligned, and a vertical guide shaft (an element of the radially-retracting device/linear guide shaft/an element of the first driving device/guide member) 38 (see FIGS. 8 and 9) passes through vertical through-hole 36y1 and the vertical through-hole 36y2. Both ends of the vertical guide shaft 38 are fixed to the housing 11, and therefore, the vertical moving frame 36 can move along the vertical guide shaft 38 in the y-axis direction inside the camera. More specifically, the vertical moving frame 36 can move between the photographing position shown in FIG. 1 and the retracted position shown in FIG. 2. When the vertical moving frame 36 is positioned in the photographing position as shown in FIG. 2, the centers of the third lens group 13e, the low-pass filter 13f and the CCD 13g in the CCD holder 30 are positioned on the photographing optical axis Z1. When the vertical moving frame 36 is positioned in the radially retracted position as shown in FIG. 1, the centers of the third lens group 13e, the low-pass filter 13f and the CCD 13g are positioned in the off-optical-axis retracted position Z2 that is located above the fixed ring portion 16.

The vertical moving frame 36 is provided with a spring hooking portion 36f which projects horizontally from a side surface of the vertical moving frame 36 in a direction away from the vertical through-hole 36y1, and a vertical moving frame biasing spring (biasing device) 39 is extended between the spring hooking portion 36f and a spring hooking portion 11a (see FIGS. 8 and 15) fixed to the housing 11 therein. The vertical moving frame biasing spring 39 is an extension coil spring and biases the vertical moving frame 36 downward (i.e., toward the photographing position thereof shown in FIG. 2).

As described above, the horizontal moving frame 32 that holds the CCD holder 30 is supported by the vertical moving frame 36 to be movable in the x-axis direction with respect to the vertical moving frame 36, and the vertical moving frame 36 is supported by the housing 11 via the vertical guide shaft 38 to be movable in the y-axis direction with respect to the housing 11. Image shake can be counteracted by moving the CCD holder 30 in the x-axis direction and the y-axis direction. To this end, a horizontal driving lever (an element of the sub-positioning device/positioning member) 40 and a vertical driving lever (positioning device/positioning member) 41 are provided as elements of a driving mechanism which achieves such movement of the CCD holder 30. The horizontal driving lever 40 and the vertical driving lever 41 are pivoted on a lever pivot shaft 42 to be rotatable (swingable) independently of each other. The lever pivot shaft 42 is positioned in the housing 11 and fixed thereto to be parallel to the photographing optical axis Z1.

Figure 9:
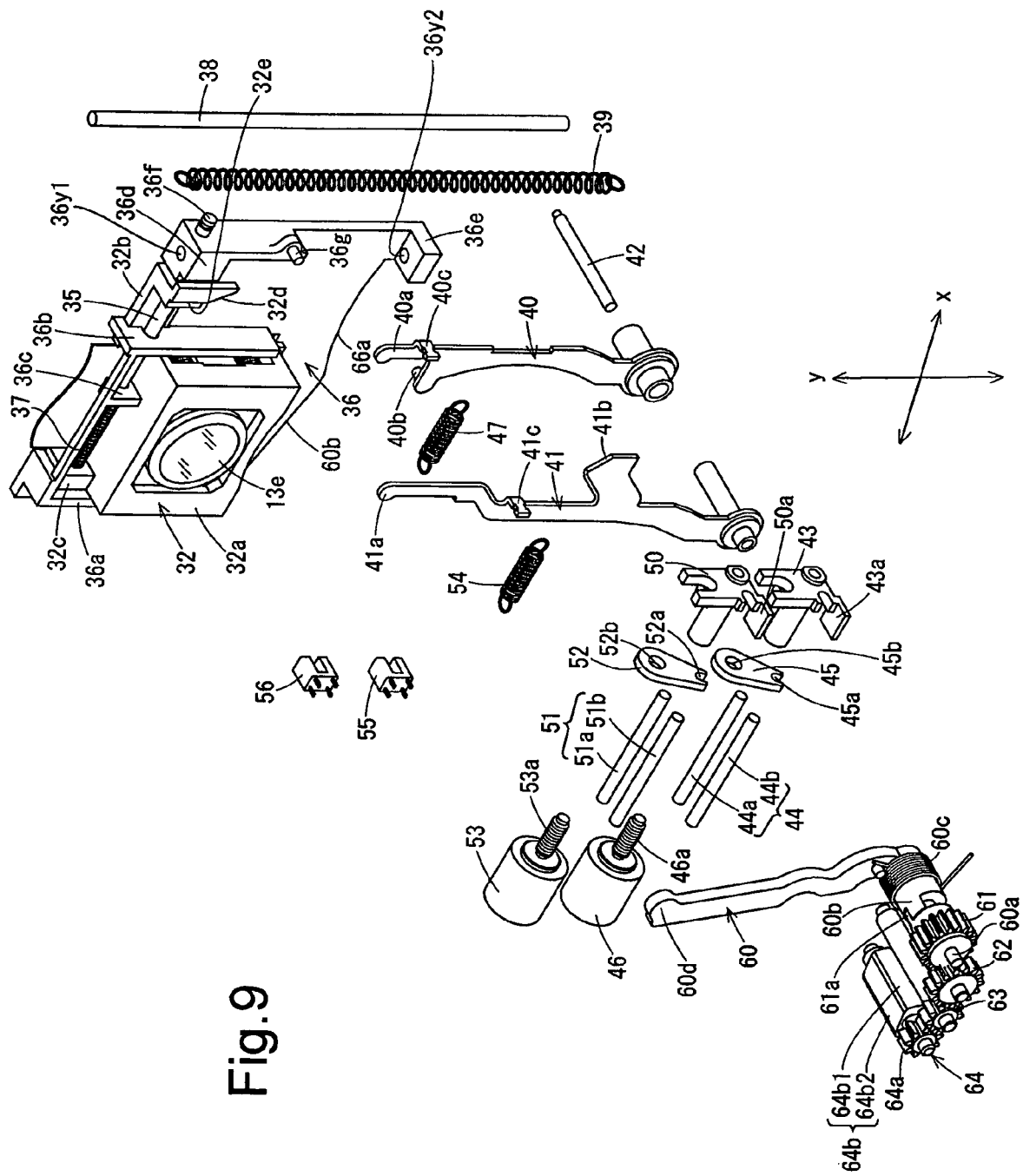
FIG. 9 is an exploded perspective view of elements of an image stabilizing mechanism and a radially-retracting mechanism which are shown in FIG. 8.
Figure 12:
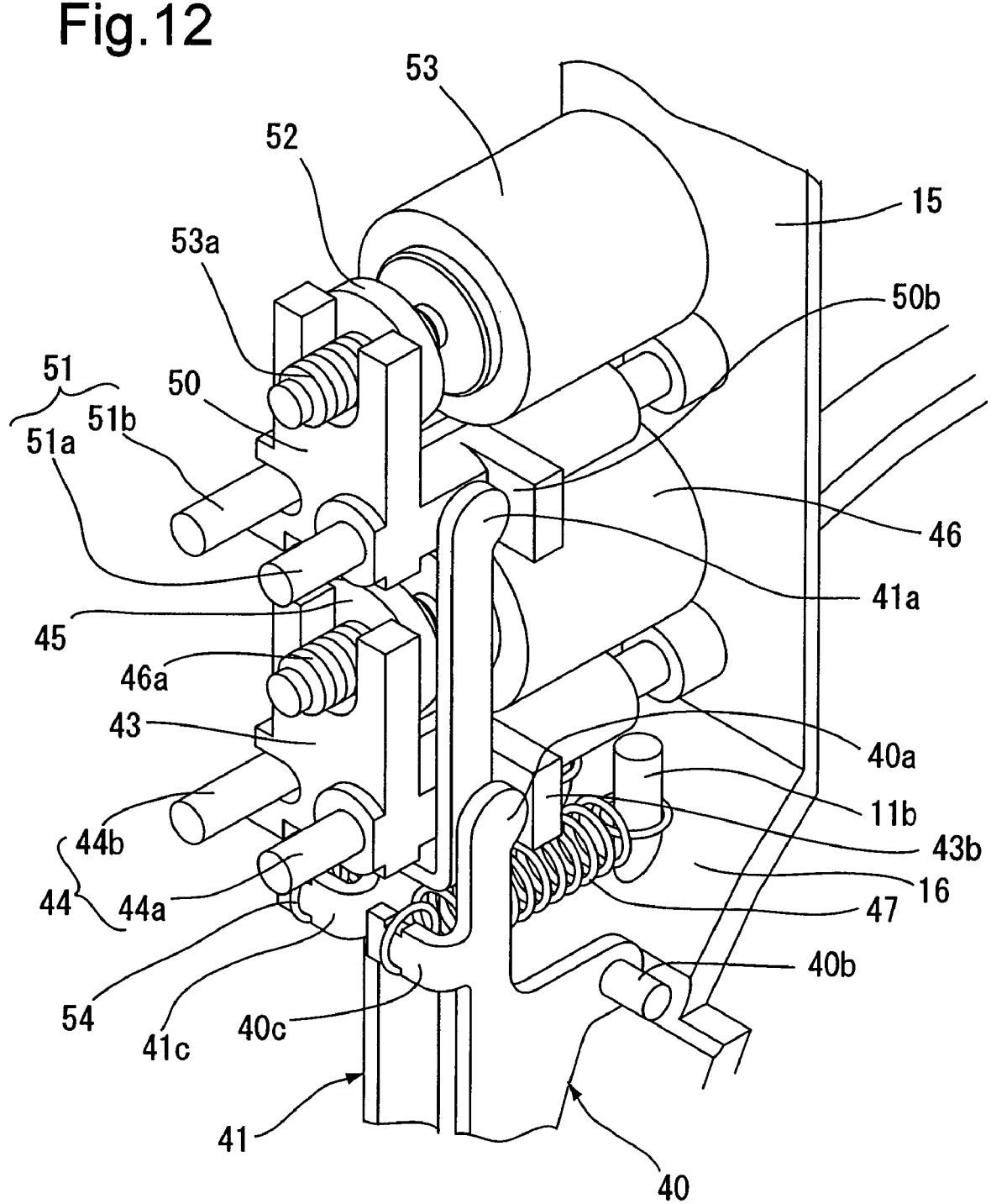
FIG. 12 is a rear perspective view of a portion of the image stabilizing mechanism as viewed from the rear side of FIGS. 10 and 11.
Figure 13:
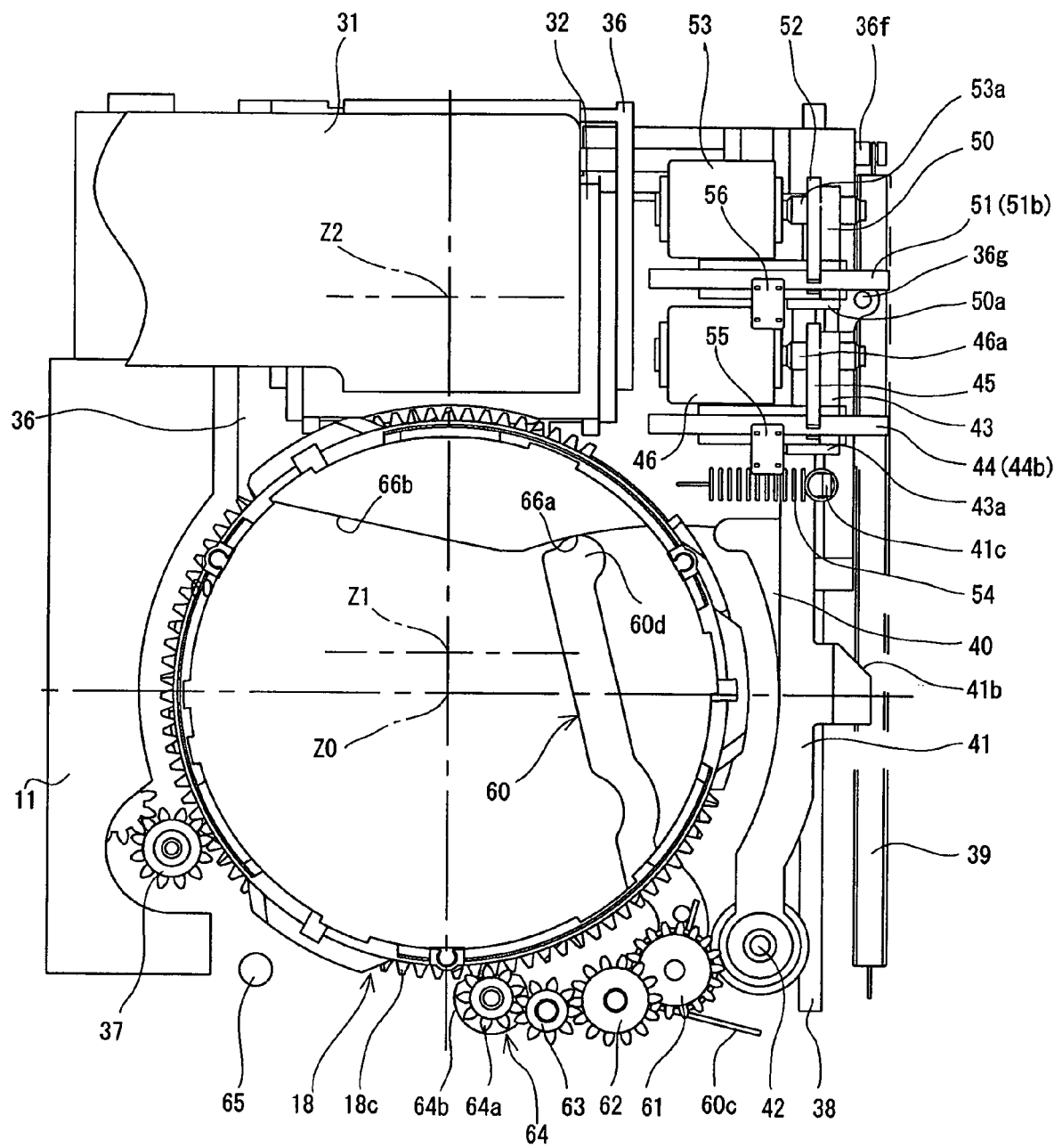
FIG. 13 is a front elevational view of the image stabilizing mechanism and the radially-retracting mechanism in the state shown in FIG. 10, as viewed from the front in the optical axis direction.
Figure 14:
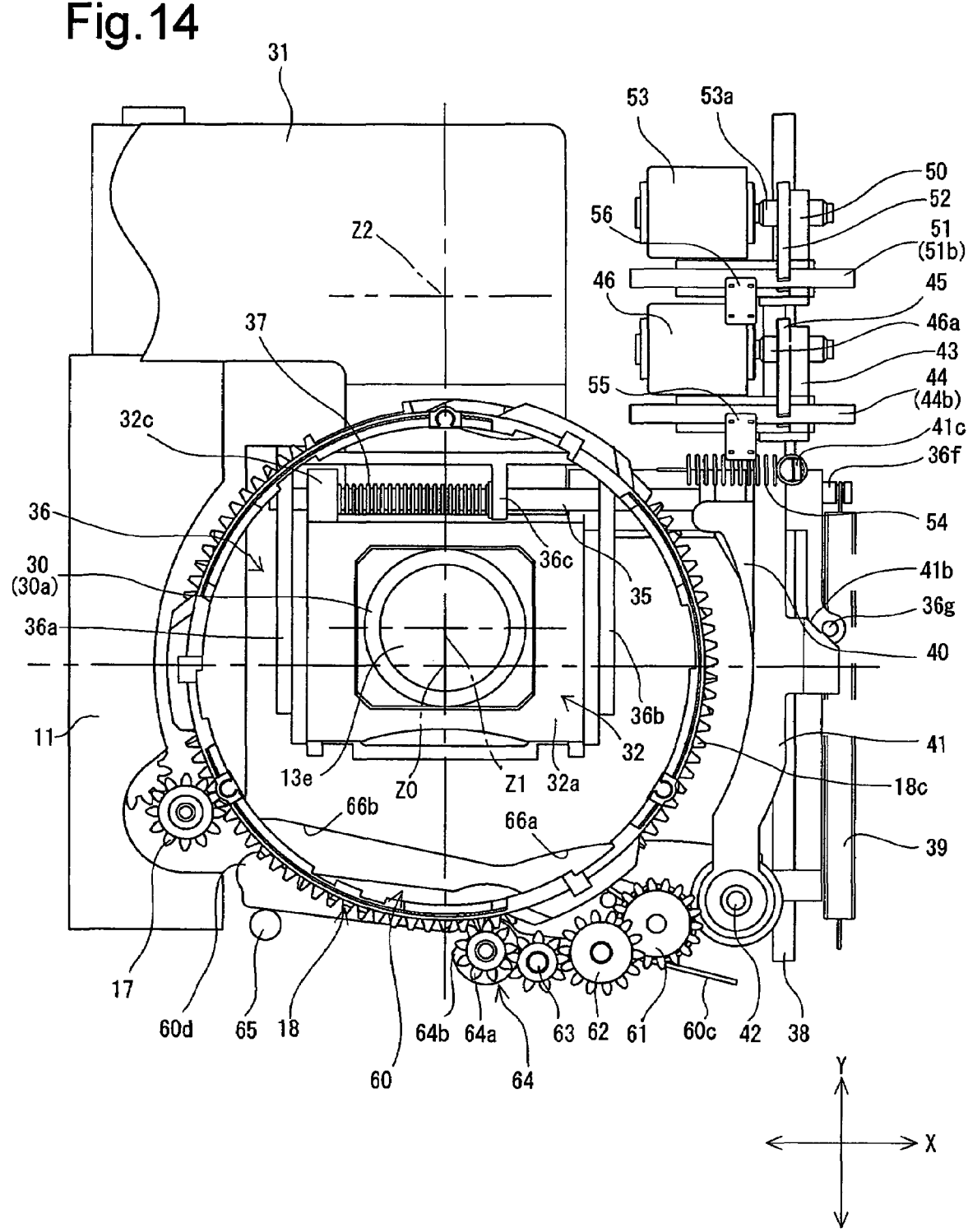
FIG. 14 is a front elevational view of the image stabilizing mechanism and the radially-retracting mechanism in the state shown in FIG. 11, as viewed from the front in the optical axis direction.
Figure 20:
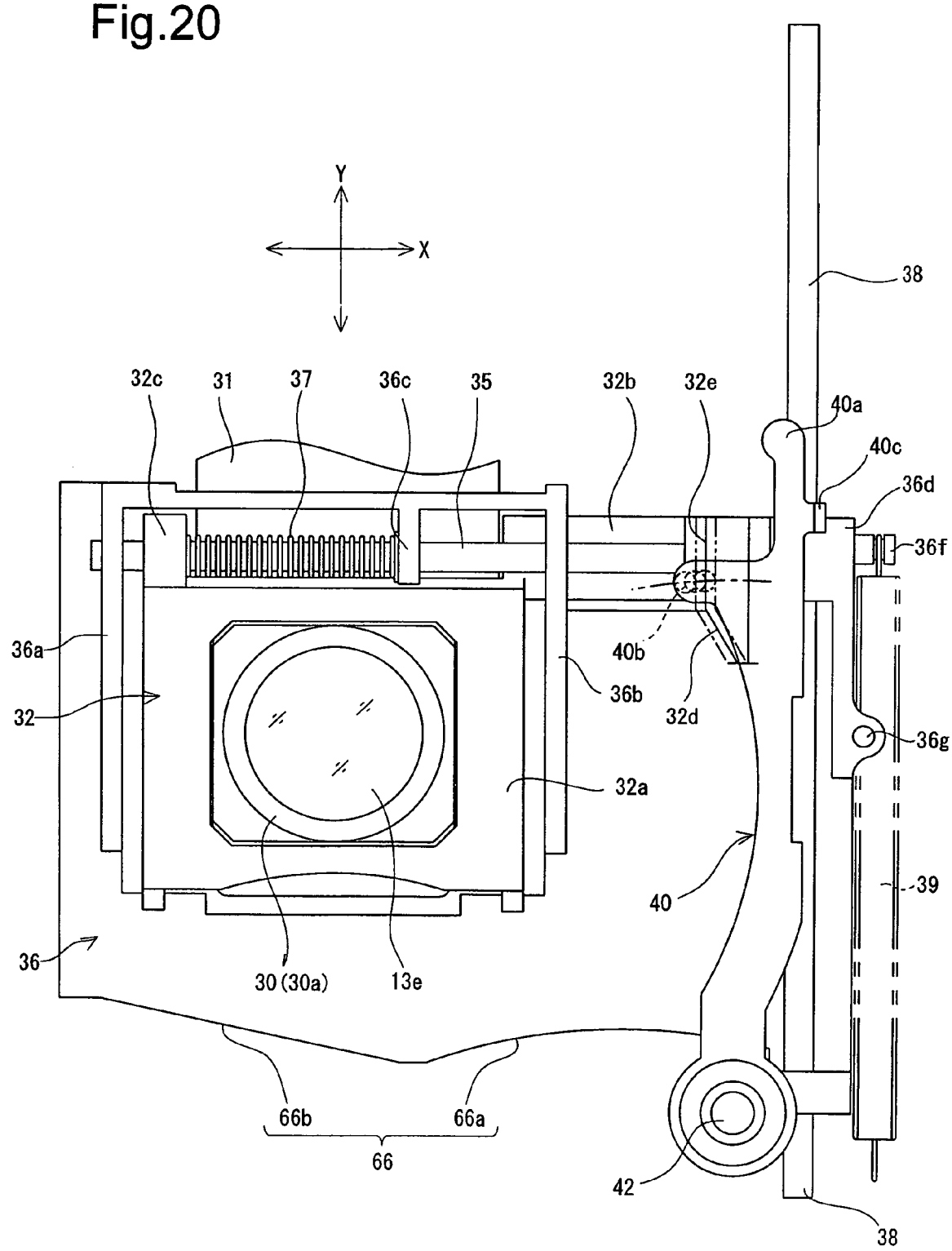
FIG. 20 is a front elevational view of the elements shown in FIGS. 16 through 17 and other associated elements, illustrating an image stabilizing action in the horizontal direction by an operation of a horizontal driving lever.

As shown in FIGS. 9 and 20, the horizontal driving lever 40 is pivoted at the lower end thereof on the lever pivot shaft 42, and is provided at the upper end of the horizontal driving lever 40 with a force-applying end 40a. The horizontal driving lever 40 is provided in the vicinity of the force-applying end 40a with an operation pin (an element of the sub-positioning device/positioning member) 40b which projects rearward in the optical axis direction and a spring hooking portion 40c which projects forward in the optical axis direction. As shown in FIG. 12, the force-applying end 40a of the horizontal driving lever 40 abuts against a lug 43b of a first moving member 43. The first moving member 43 is supported by a pair of parallel guide bars 44 (44a and 44b) to be slidable thereon in the x-axis direction, and a driven nut member 45 abuts against the first moving member 43. The driven nut member 45 is provided with a female screw hole 45b and a rotation restricting groove 45a (see FIG. 9) which is slidably fitted on the guide bar 44b. A drive shaft (a feed screw) 46a of a first stepping motor (an element of the second driving device) 46 is screwed into the female screw hole 45b. As shown in FIGS. 13 and 14, the driven nut member 45 abuts against the first moving member 43 from the left side. One end of an extension coil spring 47 is hooked on the spring hooking portion 40c of the horizontal driving lever 40, and the other end of the spring 47 is hooked on a spring hooking portion 11b which projects from an inner surface of the housing 11 (see FIG. 12). The extension coil spring 47 biases the horizontal driving lever 40 in a direction to bring the first moving member 43 to abut against the driven nut member 45, i.e., in a counterclockwise direction as viewed in FIGS. 13, 14 and 20. Due to this structure, driving the first stepping motor 46 causes the driven nut member 45 to move along the pair of guide bars 44, and at the same time causes the first moving member 43 to move together with the driven nut member 45, thus causing the horizontal driving lever 40 to swing about the lever pivot shaft 42. Specifically, moving the driven nut member 45 rightward as viewed in FIGS. 13 and 14 causes the driven nut member 45 to press the first moving member 43 in the same direction against the biasing force of the extension spring 47, thus causing the horizontal driving lever 40 to rotate clockwise as viewed in FIGS. 13 and 14. Conversely, moving the driven nut member 45 leftward as viewed in FIGS. 13 and 14 causes the first moving member 43 to move in the same direction while following the leftward movement of the driven nut member 45 due to the biasing force of the extension coil spring 47, thus causing the horizontal driving lever 40 to rotate counterclockwise as viewed in FIGS. 13 and 14.

As shown in FIG. 20, the operation pin 40b of the horizontal driving lever 40 abuts against the position restricting surface 32e that is provided on the end portion of the arm portion 32b of the horizontal moving frame 32. Since the horizontal moving frame 32 is biased leftward as viewed in FIG. 20 by the horizontal moving frame biasing spring 37, the operation pin 40b remains in contact with the position restricting surface 32e. When the horizontal driving lever 40 swings, the position of the operation pin 40b changes along the x-axis direction, so that the horizontal moving frame 32 moves along the horizontal guide shaft 35. Specifically, rotating the horizontal driving lever 40 clockwise as viewed in FIG. 20 causes the operation pin 40b to press the position restricting surface 32e, which causes the horizontal moving frame 32 to move rightward as viewed in FIG. 20 against the biasing force of the horizontal moving frame biasing spring 37. Conversely, rotating the horizontal driving lever 40 counterclockwise as viewed in FIG. 20 causes the operation pin 40b to move in a direction away from the position restricting surface 32e (leftward as viewed in FIG. 20), which causes the horizontal moving frame 32 to move in the same direction while following the leftward movement of the operation pin 40b due to the biasing force of the horizontal moving frame biasing spring 37.

Figure 21:
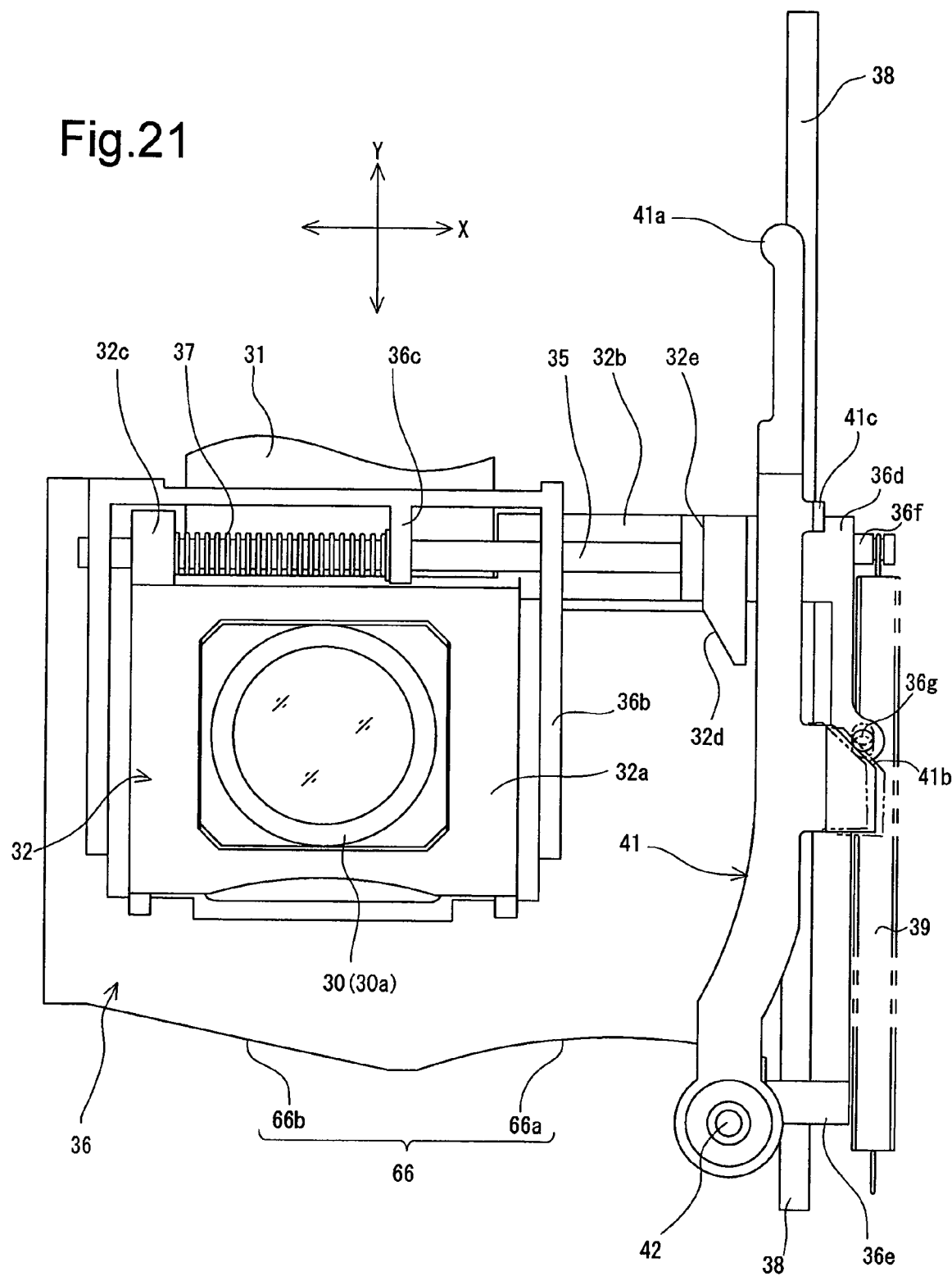
FIG. 21 is a front elevational view of the elements shown in FIG. 20, illustrating an image stabilizing action in the vertical direction by an operation of a vertical driving lever.

As shown in FIGS. 9 and 21, the vertical driving lever 41 is pivoted at its lower end on the lever pivot shaft 42, as in the case of the horizontal driving lever 40, and is provided at the upper end of the vertical driving lever 41 with a force-applying end 41a. The vertical driving lever 41 is longer than the horizontal driving lever 40, and the force-applying end 41a protrudes upward to a position higher than the position of the force-applying end 40a. The vertical driving lever 41 is provided between the lever rotating shaft 42 and the force-applying end 41a with a pressing inclined surface (positioning member/inclined surface) 41b which projects rightward as viewed in FIG. 21. The vertical driving lever 41 is provided above the pressing inclined surface 41b with a spring hooking portion 41c. As shown in FIG. 12, the force-applying end 41a abuts against a lug 50b of a second moving member 50. The second moving member 50 is supported by a pair of parallel guide bars 51 (51a and 51b) to be slidable thereon in the x-axis direction, and a driven nut member 52 abuts against the second moving member 50. The driven nut member 52 is provided with a female screw hole 52b and a rotation restricting groove 52a which is slidably fitted on the guide bar 51b. A drive shaft (a feed screw) 53a of a second stepping motor 53 is screwed into the female screw hole 52b. As shown in FIGS. 13 and 14, the driven nut member 52 abuts against the second moving member 50 from the left side as viewed from the front of the camera. One end of an extension coil spring 54 is hooked on the spring hooking portion 41c of the vertical driving lever 41, and the other end of the spring 54 is hooked on a spring hooking portion (not shown) formed on an inner surface of the housing 11. The extension coil spring 54 biases the vertical driving lever 41 in a direction to bring the second moving member 50 to abut against the driven nut member 52, i.e., in the counterclockwise direction as viewed in FIGS. 13, 14, and 21. Due to this structure, driving the second stepping motor 53 causes the driven nut member 52 to move along the pair of guide bars 51, and at the same time causes the second moving member 50 to move together with the driven nut member 52, thus causing the vertical driving lever 41 to swing about the lever pivot shaft 42. Specifically, moving the driven nut member 52 rightward as viewed in FIGS. 13 and 14 causes the driven nut member 52 to press the second moving member 50 in the same direction against the biasing force of the extension spring 54, thus causing the vertical driving lever 41 to rotate clockwise as viewed in FIGS. 13 and 14. Conversely, moving the driven nut member 52 leftward as viewed in FIGS. 13 and 14 causes the second moving member 50 to move in the same direction while following the leftward movement of the driven nut member 52 due to the biasing force of the extension spring 54, thus causing the vertical driving lever 41 to rotate counterclockwise as viewed in FIGS. 13 and 14.

As shown in FIG. 21, the pressing inclined surface 41b of the vertical driving lever 41 can come into contact with a pressed pin 36g which projects forward from the upper bearing portion 36d of the vertical moving frame 36. Since the vertical moving frame 36 is biased downwards as viewed in FIG. 21 by the vertical moving frame biasing spring 39, the pressed pin 36g always remains in contact with the pressing inclined surface 41b. When the vertical driving lever 41 swings, the abutting angle of the pressing inclined surface 41b relative to the pressed pin 36g changes, so that the vertical moving frame 36 moves along the vertical guide shaft 38. Specifically, rotating the vertical driving lever 41 clockwise as viewed in FIG. 21 causes the pressing inclined surface 41b to press the pressed pin 36g upward as viewed in FIG. 21, which causes the vertical moving frame 36 to move upward against the biasing force of the vertical moving frame biasing spring 39. Conversely, rotating the vertical driving lever 41 counterclockwise as viewed in FIG. 21 causes the abutting point on the pressing inclined surface 41b relative to the pressed pin 36g to descend, which causes the vertical moving frame 36 to move downward by the biasing force of the vertical moving frame biasing spring 39.

In the above-described structure, the horizontal moving frame 32 can be caused to move left or right in the x-axis direction by driving the first stepping motor 46 forward or reverse. Furthermore, the vertical moving frame 36 can be caused to move upwards or downwards in the y-axis direction by driving the second stepping motor 53 forward or reverse.

The first moving member 43 is provided with a plate portion 43a, and the second moving member 50 is provided with a plate portion 50a. The initial position of the horizontal moving frame 32 can be detected by a photo sensor 55 having a light emitter and a light receiver which are spaced apart from each other as shown in FIGS. 8, 10 and 11 when the plate portion 43a passes between the light emitter and the light receiver of the photo sensor 55. The plate portion 43a and the photo sensor 55 constitute a photo interrupter. Likewise, the initial position of vertical moving frame 36 can be detected by a photo sensor 56 having a light emitter and a light receiver which are spaced apart from each other as shown in FIGS. 8, 10 and 11 when the plate portion 50a passes between the light emitter and the light receiver of the photo sensor 56. The plate portion 50a and the photo sensor 56 constitute a photo interrupter. The two photo sensors 55 and 56 are fixed in two fixing holes 15a1 and 15a2 (see FIG. 8) formed on a front wall of the housing 11 to be supported thereby.

The present embodiment of the zoom lens camera has an image-shake detection sensor 57 (see FIG. 5) which detects the angular velocity around two axes (the vertical and horizontal axes of the camera) orthogonal to each other in a plane perpendicular to the photographing optical axis Z1. The magnitude and the direction of camera shake (vibrations) are detected by the image-shake detection sensor 57. The control circuit 14a determines a moving angle by time-integrating the angular velocity of the camera shake in the two axial directions, detected by the image-shake detection sensor 57. Subsequently, the control circuit 14a calculates from the moving angle the moving amounts of the image on a focal plane (imaging surface/light receiving surface of the CCD 13g) in the x-axis direction and in the y-axis direction. The control circuit 14 further calculates the driving amounts and the driving directions of the horizontal moving frame 32 and the vertical moving frame 36 for the respective axial directions (driving pulses for the first stepping motor 46 and the second stepping motor 53) in order to counteract the camera shake. Thereupon, the first stepping motor 46 and the second stepping motor 53 are actuated and the operations thereof are controlled in accordance with the calculated values. In this manner, each of the horizontal moving frame 32 and the vertical moving frame 36 is driven in the calculated direction by the calculated amount in order to counteract the shake of the photographing optical axis Z1 to thereby stabilize the image on the focal plane. The camera can be put into this image stabilization mode by turning on a photographing mode select switch 14e (see FIG. 5). If the switch 14e is in an off-state, the image stabilizing capability is deactivated so that a normal photographing operation is performed.

Figure 22:
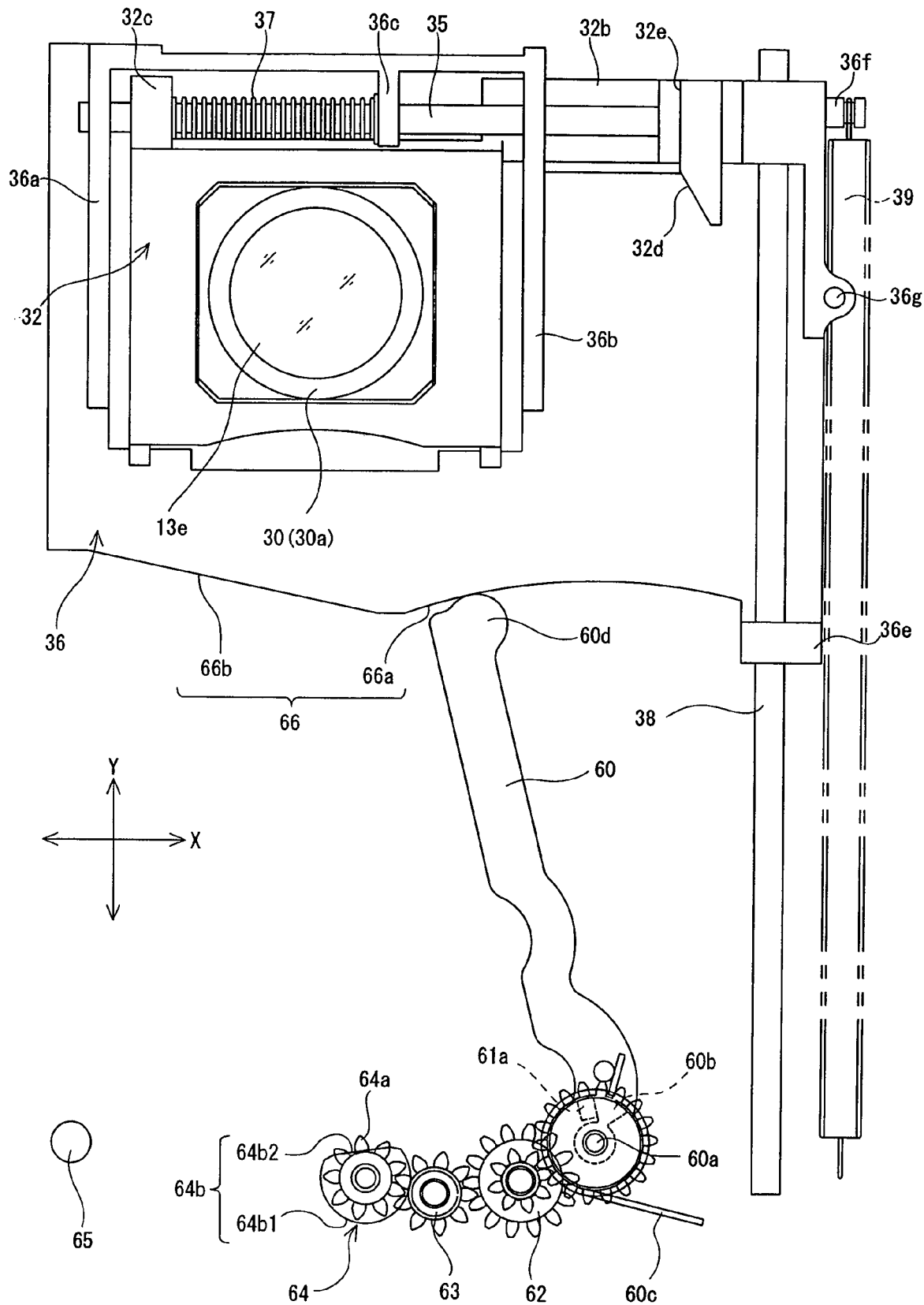
FIG. 22 is a front elevational view of elements of the image stabilizing mechanism and the radially-retracting mechanism, illustrating the retracted state of the CCD holder, the horizontal moving frame and the vertical moving frame which are retracted by an operation of a retracting lever.
Figure 23:
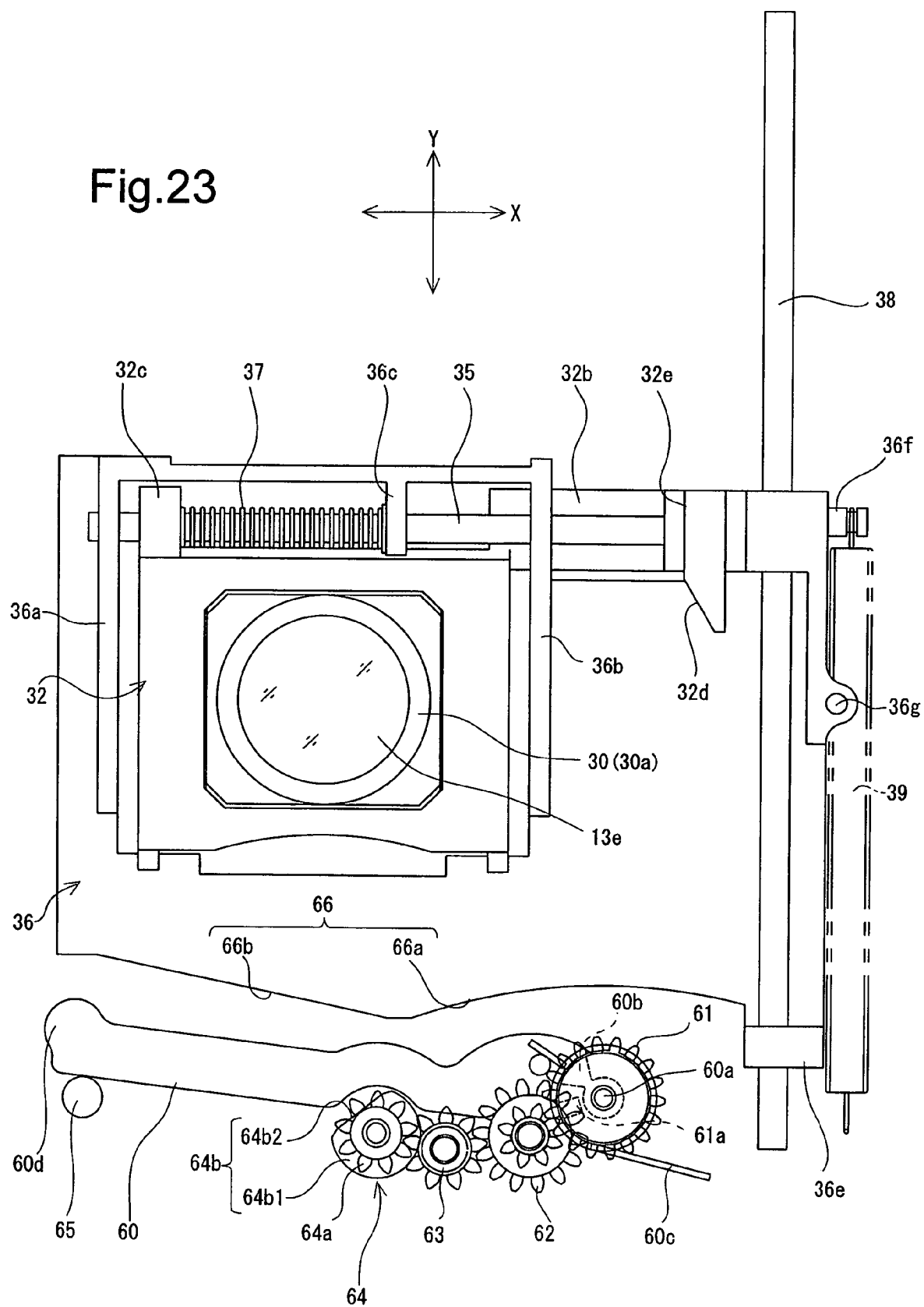
FIG. 23 is a front elevational view of the elements shown in FIG. 22, illustrating a state in which the CCD holder, the horizontal moving frame and the vertical moving frame return to their respective photographing positions where the CCD holder is positioned on the photographing optical axis when the retracting lever is disengaged from the vertical moving frame to stop upholding the vertical moving frame.

The present embodiment of the zoom lens camera uses part of the above-described image stabilizing mechanism to perform the retracting operation (radially retracting operation) of the third lens group 13e, the low-pass filter 13f and the CCD 13g toward the off-optical-axis retracted position Z2 into the retraction space SP when the zoom lens 10 is retracted from a photographic state. As shown in FIGS. 22 and 23, a retracting lever (radially-retracting device/an element of the first driving device) 60 is provided below the vertical moving frame 36. The retracting lever 60 is pivoted on a pivot shaft 60a to be rotatable (swingable) thereabout. A coaxial gear 61 is installed adjacent to the retracting lever 60, and is coaxially provided on the pivot shaft 60a to be rotatable on the pivot shaft 60a. A rotational force is transferred from an interconnecting gear 64 to the coaxial gear 61 via two relay gears 62 and 63. The pivot shaft 60a, which serves as the rotation axis of each of the retracting lever 60 and the coaxial gear 61, the rotation axes of the relay gears 62 and 63, and the rotation axis of the interconnecting gear 64 are each parallel to the rotation center axis Z0 (and the photographing optical axis Z1).

As shown in FIGS. 9, 22 and 23, the retracting lever 60 is provided in the vicinity of the pivot shaft 60a with a rotation transfer protrusion 60b having a sector-shaped cross section and projecting forward in the optical axis direction. The coaxial gear 61 is provided, at a rear end thereof, with a rotation transfer protrusion 61a which projects rearward in the optical axis direction, has the same diameter of that of the rotation transfer protrusion 60b, and is coaxial with the pivot shaft 60a. Namely, the rotation transfer protrusion 60b and the rotation transfer protrusion 61a have the same diameter and are positioned on the pivot shaft 60a to be circumferentially engageable with each other. The coaxial gear 61 transfers a rotation thereof to the retracting lever 60 by engaging the rotation transfer protrusion 61a with the rotation transfer protrusion 60b of the retracting lever 60. When the coaxial gear 61 rotates in a direction to disengage the rotation transfer protrusion 61a from the rotation transfer protrusion 60b, the rotational force of the coaxial gear 61 is not transferred to the retracting lever 60. The retracting lever 60 is biased to rotate counterclockwise as viewed in FIGS. 22 and 23 by a torsion spring 60c, and the housing 11 is provided therein with a stop projection 65 (see FIGS. 13, 14, 22 and 23) which defines the limit of rotation of the retracting lever 60 in the biasing direction of the torsion spring 60c. Namely, the retracting lever 60 comes in contact with the stop projection 65 as shown in FIG. 23 when fully rotated counterclockwise as viewed in FIGS. 22 and 23.

The vertical moving frame 36 is provided on a bottom surface thereof with an abutment surface 66 consisting of an arc-shaped surface 66a and a leading surface 66b. The arc-shaped surface 66a has an arc shape which corresponds to an arc pivoted on the axis of the pivot shaft 60a of the retracting lever 60, and the leading surface 66b is formed as a flat inclined surface. The lowermost point of the leading surface 66b is located at the portion thereof which is connected to the arc-shaped surface 66a, and the leading surface 66b gradually rises in a direction away from the arc-shaped surface 66a (in a direction to approach the left side surface of the vertical moving frame 36 as viewed in FIGS. 22 and 23).

The interconnecting gear 64 is provided with a gear portion 64a and a rotation restricting portion 64b at different positions in the axial direction of interconnecting gear 64. The rotation restricting portion 64b has a non-circular (D-shaped) cross-sectional shape and includes a large-diameter cylindrical portion 64b1 and a flat portion 64b2. The large-diameter cylindrical portion 64b1 has an incomplete cylindrical shape having a diameter larger than that of the gear portion 64a. The flat portion 64b2 is formed on the rotation restricting portion 64b in a manner so that a part of the large diameter cylindrical portion 64b1 appears to be cut off to form a nearly flat shape. In an area in which the flat portion 64b2 is formed, the tips of the teeth of the gear portion 64a project radially outwards from the rotation restricting portion 64b. The flat portion 64b2 is formed as a flat surface which includes a straight line parallel to the axis of rotation of the interconnecting gear 64.

The interconnecting gear 64 is positioned to face the outer surface of the helicoid ring 18. The spur gear 18c faces either the gear portion 64a of the interconnecting gear 64 (in the state shown in FIGS. 11 and 14) or the rotation restricting portion 64b (in the state shown FIGS. 10 and 13) depending on the axial position (and the type of motion) of the helicoid ring 18 in the optical axis direction. When the helicoid ring 18 rotates at a fixed position as described above, the spur gear 18c is engaged with the gear portion 64a. As the helicoid ring 18 moves in the retracting direction from the fixed-position rotating state, the spur gear 18c is disengaged from the interconnecting gear 64 to face the rotation restricting portion 64b, so that the transfer of rotation of the helicoid ring 18 to the interconnecting gear 64 is stopped.

The operation of the retracting lever 60 will be discussed in detail hereinafter. FIG. 23 shows elements of the image stabilizing mechanism and the retracting mechanism in a state where the zoom lens 10 is set at the wide-angle extremity. In this state, the third lens group 13e, the low-pass filter 13f and the CCD 13g are positioned on the photographing optical axis Z1 (see the upper half of the zoom lens 10 shown in FIG. 2), and also the helicoid ring 18 is in a state where the helicoid ring 18 is only allowed to rotate at a fixed position in the optical axis direction (see FIG. 6) while the gear portion 64a of the interconnecting gear 64 is engaged with the spur gear 18c of the helicoid ring 18. When the helicoid ring 18 rotates in the retracting direction from the wide-angle extremity, the coaxial gear 61 rotates clockwise as viewed in FIG. 23 via the interconnecting gear 64 and the relay gears 62 and 63. As shown in FIG. 23, since the rotation transfer protrusion 61a and the rotation transfer protrusion 60b are slightly apart from each other when the zoom lens 10 is set at the wide-angle extremity, no rotational force is transferred from the coaxial gear 61 to the retracting lever 60 for a short period of time after the coaxial gear 61 starts rotating. Accordingly, the retracting lever 60 is held in the position shown in FIG. 23 where the retracting lever 60 is in contact with the stop projection 65 due to the biasing force of the torsion spring 60c. Thereafter, upon the rotation transfer protrusion 61a coming into contact with the rotation transfer protrusion 60b and pressing the rotation transfer protrusion 60b, the retracting lever 60 starts rotating clockwise with respect to FIG. 23 against the biasing force of the torsion spring 60c. In the present embodiment, the timing of the commencement of rotation of the retracting lever 60 substantially corresponds to the angular position θ2 at which the cam ring 26 starts retracting in the optical axis direction from the fixed position rotation state (see FIG. 6).

When the retracting lever 60 rotates clockwise from the angular position shown in FIG. 23, a force-applying end 60d formed at the free end of the retracting lever 60 is brought into contact with the leading surface 66b of the abutment surface 66 of the vertical moving frame 36. A further clockwise rotation of the retracting lever 60 causes the retracting lever 60 to lift the vertical moving frame 36 according to the inclined shape of the leading surface 66b, thus causing the vertical moving frame 36 to move upward in the housing 11 along the vertical guide shaft 38.

Figure 15:
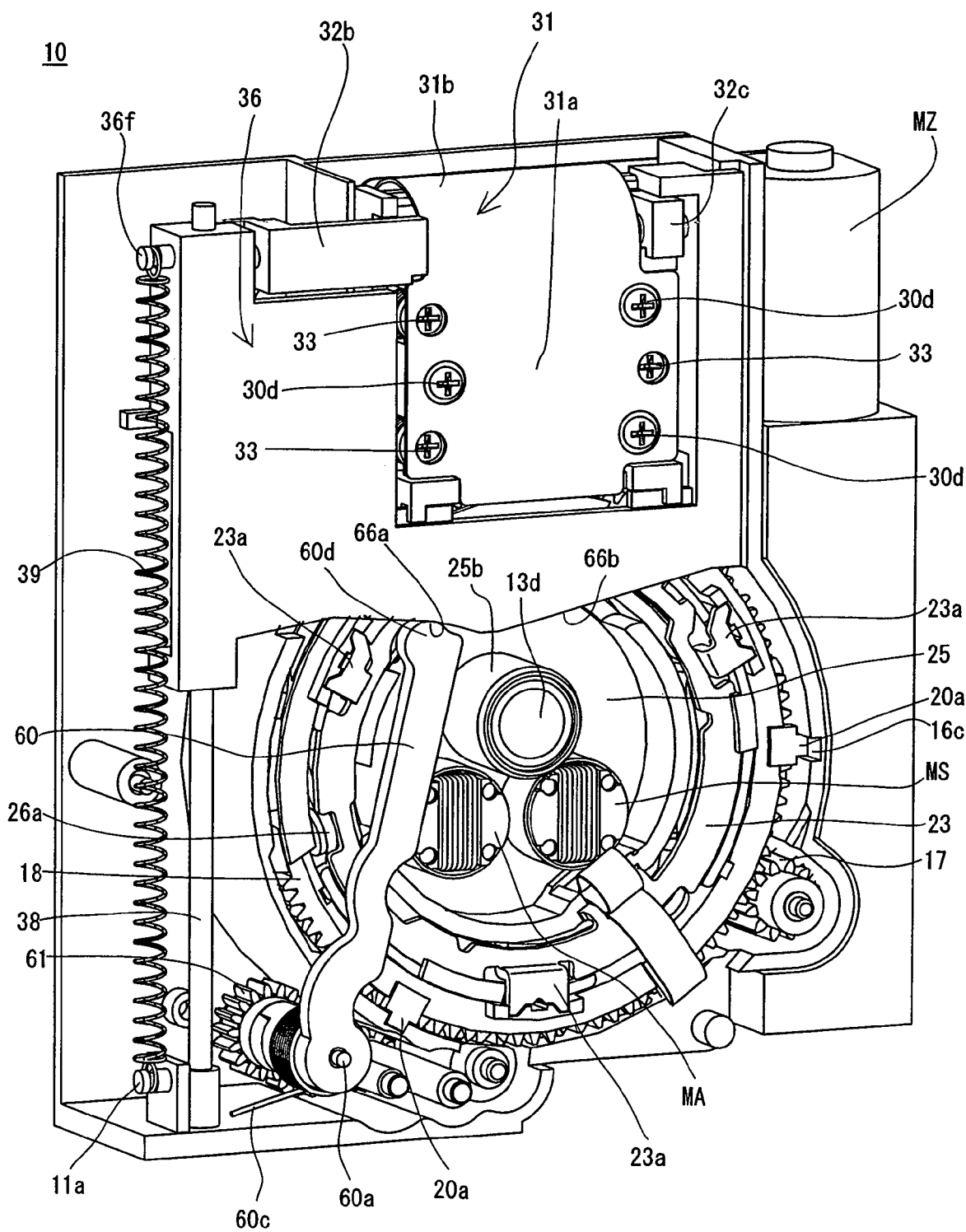
FIG. 15 is a rear perspective view of the zoom lens in the retracted state of the zoom lens shown in FIG. 1.

On and after the angular position exceeding θ1 shown in FIG. 6, when the helicoid ring 18 rotates in the retracting direction, the rotating operation of the helicoid ring 18 at a fixed position in the optical axis direction ends, and subsequently the helicoid ring 18 starts moving rearward in the optical axis direction while rotating. Thereupon, the spur gear 18c of the helicoid ring 18 is disengaged from the gear portion 64a of the interconnecting gear 64, which in turn faces the flat portion 64b2 of the rotation restricting portion 64b. Since each of the spur gear 18c and the gear portion 64a has a predetermined length in the optical axis direction, the engagement between the spur gear 18c and the gear portion 64a is not released at once immediately after the fixed-position rotating state of the helicoid ring 18 changes to the rotating and retracting state thereof at the angular position θ1, but is released at an angular position θ3 at which the helicoid ring 18 further retracts in the retracting direction by a small amount of movement. Due to this disengagement of the spur gear 18c from the gear portion 64a, the rotational force of the helicoid ring 18 is no longer transferred to the interconnecting gear 64, so that the upward rotational motion of the retracting lever 60 is terminated. FIGS. 15 and 22 show the retracting lever 60 in a state in which the upward rotational motion thereof has been terminated. As can be seen in FIG. 22, the force-applying end 60d of the retracting lever 60 is in contact with the arc-shaped surface 66a after passing the boundary between the arc-shaped surface 66a and the leading surface 66b. In this state, the vertical moving frame 36 lifted by the retracting lever 60 have been moved into the retraction space SP in the housing 11 as shown in FIG. 1.

The retracting operation of the zoom lens 10 is not completed at the angular position θ3 where the upward retracting motion of the vertical moving frame 36 is completed; the helicoid ring 18 and the cam ring 26 further move rearward in the optical axis direction while rotating. Thereafter, when the helicoid ring 18 and the cam ring 26 reach their respective retracted positions shown in FIG. 1, the cylindrical portion 25b of the second lens group support frame 25 that holds the second lens group 13d is retracted into the space in the housing 11 which is formerly occupied by the vertical moving frame 36 when the zoom lens 10 is in a photographic state. In this manner, the thickness of the photographing optical system in the optical axis direction can be reduced in the retracted state of the zoom lens 10, which makes it possible to reduce the thickness of the zoom lens 10, which in turn makes it possible to reduce the thickness of a camera incorporating the zoom lens 10.

In the above-described retracting operation of the zoom lens 10, after the zoom lens 10 retracts to the angular position θ3 where the engagement between the gear portion 64a of the interconnecting gear 64 and the spur gear 18c of the helicoid ring 18 is released, the spur gear 18c faces the flat portion 64b2 of the rotation restricting portion 64b. In this state where the spur gear 18c faces the flat portion 64b2, the flat portion 64b2 is positioned in close vicinity of the tooth top (outermost periphery/addendum circle) of the spur gear 18c. Therefore, even if the interconnecting gear 64 tries to rotate, the flat portion 64b2 abuts against the outer periphery of the spur gear 18c to prevent the interconnecting gear 64 from rotating (see FIGS. 10 and 13). In this manner, the interconnecting gear 64 is prevented from rotating accidentally in the retracted state of the zoom lens 10, and thus the retracting lever 60 can be securely locked in the upper rotational position. In other words, in the retracted state shown in FIG. 22, although the retracting lever 60 is biased counterclockwise as viewed in FIG. 22 by the torsion spring 60c, the retracting lever 60 is prevented from rotating counterclockwise by a gear train consisting of the coaxial gear 61, the pair of relay gears 62 and 63 and the interconnecting gear 64. The abutting physical relationship between the flat portion 64b2 of the interconnecting gear 64 and the spur gear 18c serves as a rotation restricting device for restricting rotation of the retracting lever 60. Therefore, the retracting lever 60 can be securely held in a halting state without any complicated locking mechanism.

In a state in which the vertical moving frame 36 is radially retracted upward completely out of the linear retracting path of the first and second lens groups 13a and 13d, the force-applying end 60d of the retracting lever 60 abuts against the arc-shaped surface 66a which has an arc-shaped surface having its center on the axis of the pivot shaft 60a of the retracting lever 60. Therefore, even if the angle of the retracting lever 60 is changed, the vertical position of the vertical moving frame 36 is not changed and held constant so long as the force-applying end 60d abuts against the arc-shaped surface 66a.

The operation of the retracting mechanism from the wide-angle extremity to the retracted position has been described above. On the other hand, in the zooming range from the wide-angle extremity to the telephoto extremity, the spur gear 18c of the helicoid ring 18 rotating at a fixed position remains engaged with the gear portion 64a of the interconnecting gear 64, and thus the interconnecting gear 64 is rotated according to the rotation of the helicoid ring 18. However, rotating the helicoid ring 18 from the wide-angle extremity state shown in FIG. 23 toward the telephoto extremity causes the coaxial gear 61 to rotate counterclockwise as viewed in FIG. 23, i.e., in a direction to move the rotation transfer protrusion 61a away from the rotation transfer protrusion 60b. Therefore, in the zooming range from the wide-angle extremity to the telephoto extremity, no rotational force is transferred to the retracting lever 60, and the retracting lever 60 is held at the angular position shown in FIG. 23. In this manner, the range of rotation of the retracting lever 60 can be minimized, thereby preventing an increase in size of the zoom lens barrel.

As described above, in the zoom lens 10, the vertical moving frame 36 that is movable in the y-axis direction is biased downward in a direction from the off-optical-axis retracted position Z2 to the photographing optical axis Z1 by the vertical moving frame biasing spring 39. When the vertical moving frame 36 moves toward the photographing optical axis Z1 by the biasing force of the vertical moving frame biasing spring 39, the pressed pin 36g comes into contact with the pressing inclined surface 41b of the vertical driving lever 41 to thereby prevent the vertical moving frame 36 from further moving in the same direction as shown in FIGS. 11, 14 and 21. When the vertical moving frame 36 is at the lower limit of movement thereof in the y-axis direction, the zoom lens 10 is in the photographic state, in which a radially-retractable optical element unit which is composed of the third lens group 13e, the low-pass filter 13f and the CCD 13g is on the photographing optical axis Z1. Conversely, when the radially-retractable optical element unit (13e, 13f and 13g) is retracted away from the photographing optical axis Z1 to the off-optical-axis retracted position Z2, the vertical moving frame 36 moves upward against the biasing force of the vertical moving frame biasing spring 39 so that the pressed pin 36g moves away from the pressing inclined surface 41b of the vertical driving lever 41, which causes the positioning of the radially-retractable optical element unit (13e, 13f and 13g) by the engagement of the pressed pin 36g with the pressing inclined surface 41b to be released as shown in FIGS. 10 and 13. Accordingly, in the radially-retracting mechanism that retracts the radially-retractable optical element unit (13e, 13f and 13g) in the y-axis direction, the vertical moving frame 36 is biased toward the photographing position thereof (toward the photographing optical axis Z1), and this biasing force causes the pressed pin 36g to be pressed against the pressing inclined surface 41b of the vertical driving lever 41 to determine the photographing position of the radially-retractable optical element unit (13e, 13f and 13g) in the y-axis direction. Unless the vertical moving frame 36 is lifted by the retracting lever 60, the contacting state between the pressed pin 36g and the pressing inclined surface 41b is maintained by the biasing force of the vertical moving frame biasing spring 39, and therefore, the radially-retractable optical element unit (13e, 13f and 13g) can be securely held at the photographing position thereof in the y-axis direction. In this positioning of the radially-retractable optical element unit (13e, 13f and 13g) in the y-axis direction, the vertical driving lever 41 is held at the angular position in the state of the aforementioned normal photographing operation (in an off-state of the switch 14e), in which the aforementioned rotating operation of the vertical driving lever 41 for image stabilization is not performed.

Additionally, the radially-retractable optical element unit that is composed of the third lens group 13e, the low-pass filter 13f and the CCD 13g is also supported by the vertical moving frame 36 to be movable in the x-axis direction, that is perpendicular to the retracting direction (the y-axis direction), via the horizontal moving frame 32. The horizontal moving frame 32 is biased by the horizontal moving frame biasing spring 37 in one direction (leftward as viewed in FIGS. 13, 14, 17 and 20 through 24, which are viewed from the front of the zoom lens 10). In a photographic state, in which the position of the vertical moving frame 36 in the y-axis direction is determined by the engagement of the pressed pin 36g with the pressing inclined surface 41b, the operation pin 40b of the horizontal driving lever 40 is in contact with the position restricting surface 32e that is provided on the arm portion 32b of the horizontal moving frame 32 to determine the photographing position of the horizontal moving frame 32 in the x-axis direction as shown in FIG. 20. Since the biasing force of the horizontal moving frame biasing spring 37 acts in a direction to bring the position restricting surface 32e into contact with the operation pin 40b, the contacting state between the position restricting surface 32e and the operation pin 40b is maintained by the biasing force of the horizontal moving frame biasing spring 37 unless an external force disengaging the position restricting surface 32e and the operation pin 40b from each other is applied to the horizontal moving frame 32 or the horizontal driving lever 40, and therefore the radially-retractable optical element unit (13e, 13f and 13g) can be securely held at the photographing position thereof in the x-axis direction, similar to the positioning of the radially-retractable optical element unit (13e, 13f and 13g) in the y-axis direction. In this positioning of the radially-retractable optical element unit (13e, 13f and 13g) in the x-axis direction, the horizontal driving lever 40 is held at the angular position in the state of the aforementioned normal photographing operation (in an off-state of the switch 14e), in which the aforementioned rotating operation of the horizontal driving lever 40 for image stabilization is not performed.

In the radially-retractable optical element unit (13e, 13f and 13g) that is retracted in the y-axis direction, there is an advantage in biasing the radially-retractable optical element unit not only in the y-axis direction but also in the x-axis direction for positioning of the radially-retractable optical element unit in a photographic state where the positioning of the radially-retractable optical element unit in the y-axis direction has been made. This advantage will be discussed hereinafter. To allow the radially-retractable optical element unit (13e, 13f and 13g) to perform the radially-retracting operation thereof, the radially-retractable optical element unit basically has only to be movable in the y-axis direction. Nevertheless, biasing the radially-retractable optical element unit not only in the y-axis direction but also in the x-axis direction makes it possible to absorb error in mechanical precision of the radially-retracting mechanism for retracting the retractable optical element in the y-axis direction. For instance, since the vertical moving frame 36 is guided in the y-axis direction by the vertical guide shaft 38 in the present embodiment of the imaging device, backlash between the vertical guide shaft 38 and the vertical moving frame 36 can be eliminated by positioning the radially-retractable optical element unit with the retractable optical element being biased to move in the x-axis direction relative to the vertical moving frame 36. More specifically, the operation pin 40b can be regarded as a substantially stationary member because the operation pin 40b remains stationary unless the first stepping motor 46 is driven to rotate the horizontal driving lever 40. In addition, the horizontal moving frame biasing spring 37 biases the horizontal moving frame 32 (the spring supporting protrusion 32c) and the vertical moving frame 36 (the spring supporting portion 36c) in direction away from each other along the x-axis. Therefore, upon the positioning of the horizontal moving frame 32 being determined by the operation pin 40b, which can be considered as a stationary member, the vertical moving frame 36 is also acted upon by a biasing force in the x-axis direction as a reaction of the biasing force of the horizontal moving frame biasing spring 37 relative to the horizontal moving frame 32. As a result, the vertical moving frame 36 is stably positioned in the x-axis direction. In this manner, the zoom lens 10 incorporates a device for positioning the radially-retractable optical element unit (13e, 13f and 13g) in the x-axis direction as an auxiliary device for ensuring the reliability of the precision of the y-axis-direction retracting mechanism (radially-retracting mechanism), which makes it possible to hold the radially-retractable optical element unit at the photographing position thereof with a higher degree of precision.

Figure 24:
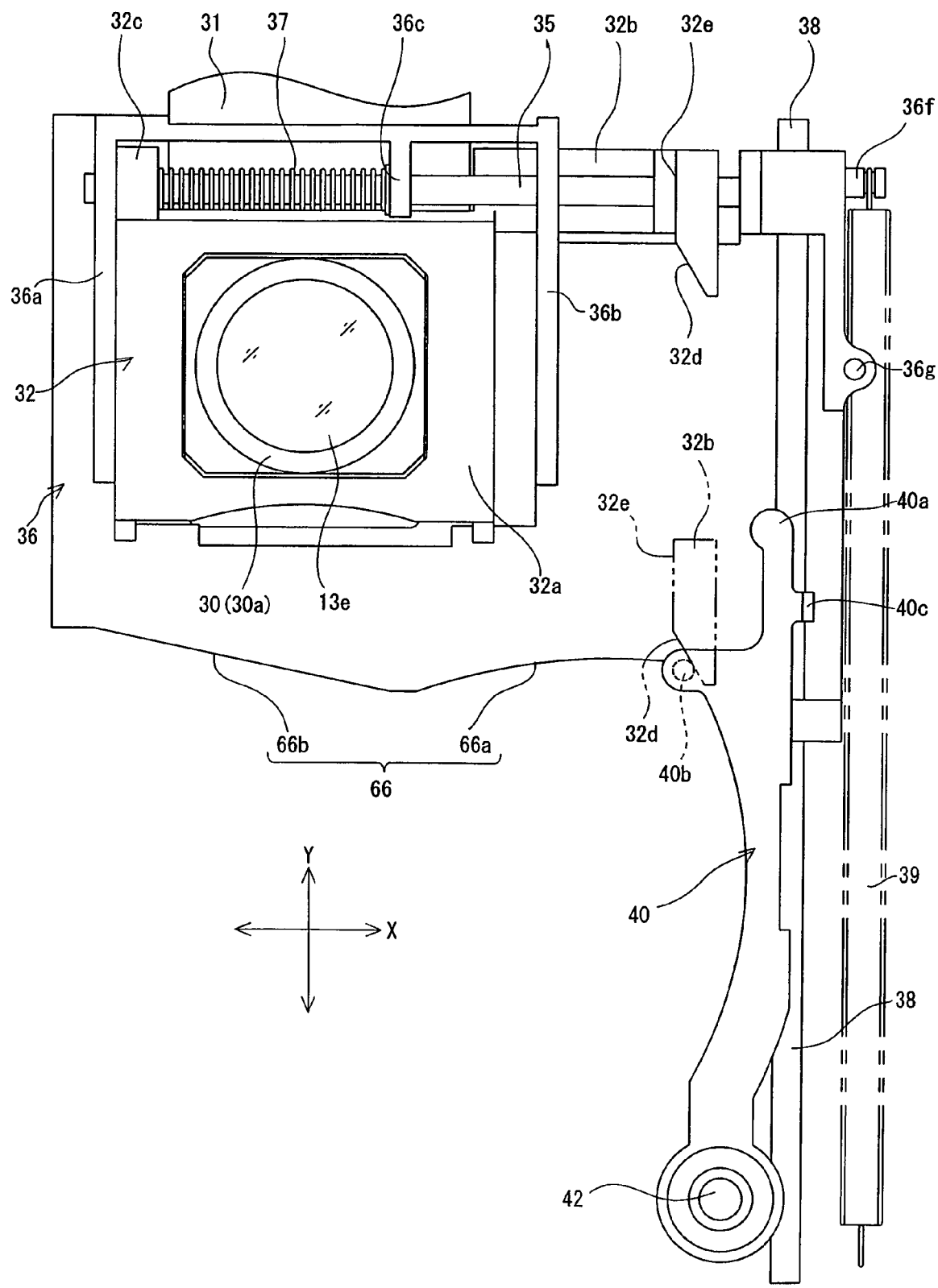
FIG. 24 is a front elevational view of elements shown in FIG. 8 for illustrating the relationship between the horizontal driving lever and the vertical motion of the CCD holder, the horizontal moving frame, and the vertical moving frame.
Figure 25:
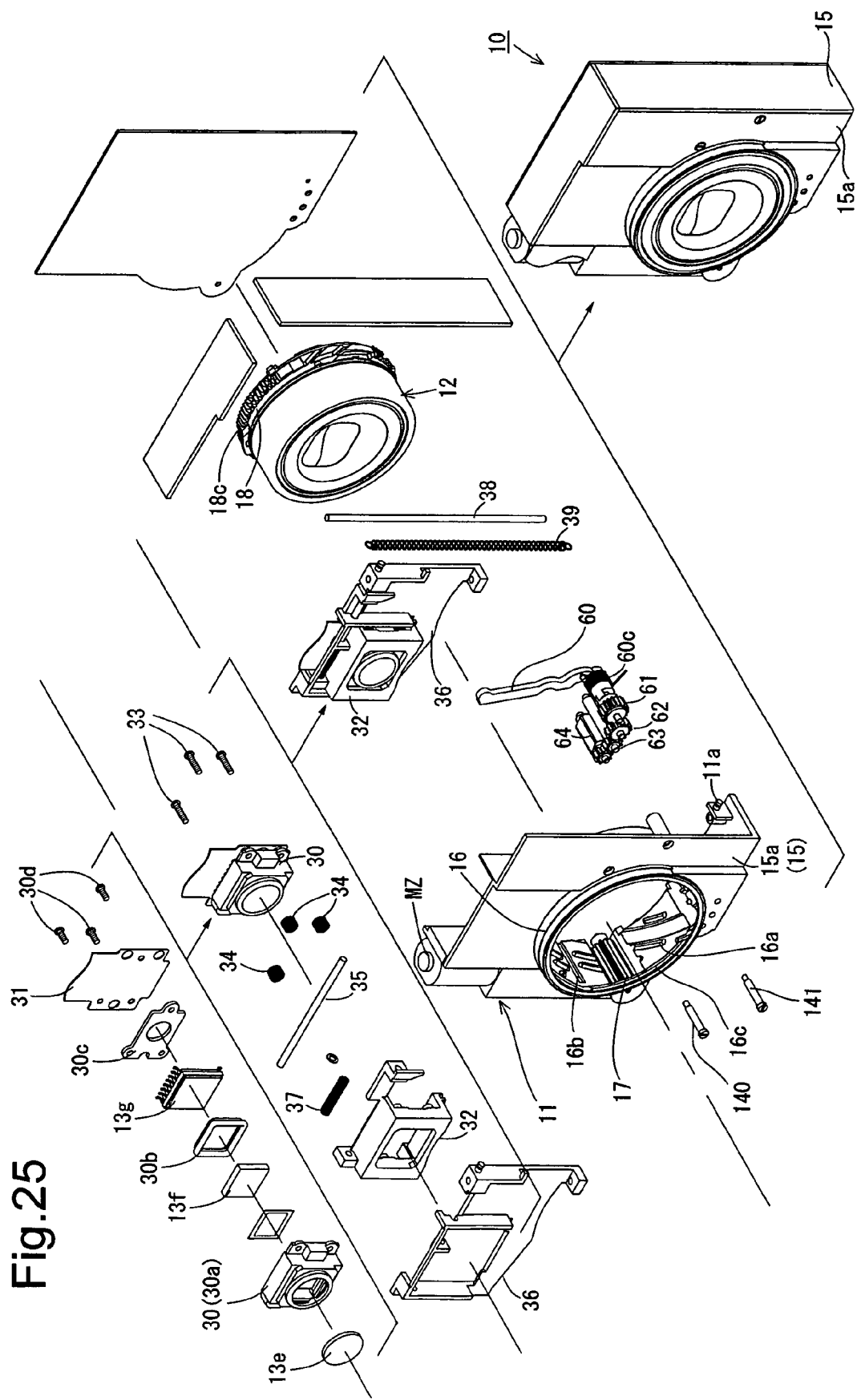
FIG. 25 is an exploded perspective view of a second embodiment of the retractable zoom lens to which the present invention is applied.

When the vertical moving frame 36 is retracted toward the off-optical-axis retracted position Z2 as the zoom lens 10 retracts (as the retracting lever 60 rotates) as shown in FIG. 24, the position restricting surface 32e that is provided on the arm portion 32b of the horizontal moving frame 32 is disengaged from the operation pin 40b that is provided on the horizontal driving lever 40. Upon this disengagement of the position restricting surface 32e from the operation pin 40b, the horizontal moving frame 32 moves leftward as viewed in FIG. 24 by the biasing force of the horizontal moving frame biasing spring 37 up to a point at which the frame portion 32a of the horizontal moving frame 32 abuts against the motion restricting frame 36a of the vertical moving frame 36. Namely, upon the vertical moving frame 36 moving away from the photographing position thereof in the y-axis direction, the horizontal moving frame biasing spring 37 that is a compression coil spring resiliently expands to thereby cause the position restricting surface 32e and the operation pin 40b to be disengaged from each other. Although the biasing force of the horizontal moving frame biasing spring 37 also serves as a device for eliminating backlash between the vertical guide shaft 38 and the vertical moving frame 36 as mentioned above, the drive load on the vertical moving frame 36 is reduced by the release of the biasing force of the horizontal moving frame biasing spring 37, which reduces the load applied to the zoom motor MZ that serves as a drive source for the retracting operation of the zoom lens 10. However, the position restricting surface 32e of the horizontal moving frame 32 has a sufficient length in the y-axis direction so as not to be disengaged from the operation pin 40b by the moving amount of the position restricting surface 32e in the y-axis direction for image stabilization which is caused by a rotation of the vertical driving lever 41.

When the vertical moving frame 36 is moved toward the photographing optical axis Z1 again from the retracted position shown by solid lines in FIG. 24, the inclined surface 32d of the horizontal moving frame 32 comes in contact with the operation pin 40*b* as shown by two-dot chain line in FIG. 24. The inclined surface 32*d* is inclined to the position restricting surface 32*e* so as to guide the operation pin 40*b* to a point at which the operation pin 40*b* comes into engagement with the inclined surface 32*d* against the biasing force of the horizontal moving frame biasing spring 37 in accordance with the downward movement of the vertical moving frame 36. Therefore, the downward movement of the vertical moving frame 36 to the photographing position thereof causes the operation pin 40*b* to come in contact with the position restricting surface 32*e* again as shown in FIG. 20, thus causing the frame portion 32*a* of the horizontal moving frame 32 to move back to the neutral position thereof between the motion restricting frame 36*a* and the motion restricting frame 36*b*. Thereupon, in the photographic state shown in FIG. 20, the biasing force of the horizontal moving frame biasing spring 37 increases, and accordingly, the horizontal moving frame 32 and the vertical moving frame 36 are stably held relative to each other in the x-axis direction. Namely, the drive load on the vertical moving frame 36 can be reduced by disengaging the operation pin 40*b* and the position restricting surface 32*e* from each other when the vertical moving frame 36 is retracted toward the off-optical-axis retracted position Z2, while the operation pin 40*b* and the position restricting surface 32*e* can be re-engaged securely with each other by the action of the inclined surface 32*d* when the vertical moving frame 36 returns to the photographing optical axis Z1.

As can be understood from the above description, in the present embodiment of the zoom lens 10, the radially-retractable optical element unit, which is retractable in the y-axis direction, is biased in a direction toward the photographing position thereof, and the positioning of the radially-retractable optical element unit in the y-axis direction and the positioning of the radially-retractable optical element unit in the x-axis direction, which is different from (intersects) the y-axis direction, are determined at the same time upon the radially-retractable optical element unit reaching the photographing position thereof in the y-axis direction, which makes it possible to position the radially-retractable optical element unit at the photographing position thereof with a high degree of precision in a photographic state of the zoom lens 10. Specifically, the radially-retractable optical element unit can be positioned at the photographing position thereof with an extremely high degree of precision because a holder (the CCD holder 30), which holds the radially-retractable optical element unit, is lock-engaged not only in the y-axis direction but also in the x-axis direction against the biasing force of a biasing device upon the retractable optical element reaching the photographing position thereof in the y-axis direction.

Although the radially-retractable optical element unit, which is composed of the third lens group 13*e*, the low-pass filter 13*f* and the CCD 13*g*, performs not only the radially-retracting operation but also the image stabilizing operation in the above described embodiment of the zoom lens 10, the present invention can also be applied to another type of imaging device such as an imaging device in which a non-retractable optical element is driven to counteract image shake or an imaging device having no image stabilizing capability. This type of imaging device having no image stabilizing capability will be hereinafter discussed with reference to FIGS. 25 through 29.

FIGS. 25 through 29 show a second embodiment of the zoom lens to which the present invention is applied. In the second embodiment of the zoom lens, elements and portions which are similar to those in the previous embodiment of the zoom lens are designated by the same reference numerals. In other words, the second embodiment of the zoom lens is the same as the previous embodiment of the zoom lens in that the horizontal moving frame 32 that supports the CCD holder 30 is guided in the x-axis direction by the horizontal guide shaft 35, that the vertical moving frame 36 that supports the horizontal moving frame 32 is guided in the y-axis direction by the vertical guide shaft 38, and that the vertical moving frame 36 is moved in the y-axis direction by a radially-retracting mechanism including the retracting lever 60. Additionally, the second embodiment of the zoom lens is the same as the previous embodiment of the zoom lens in that the zoom lens is provided with both the horizontal moving frame biasing spring 37 for biasing the horizontal moving frame 32 in one direction (leftward as viewed in FIG. 17) along the x-axis direction, and the vertical moving frame biasing spring 39 for biasing the vertical moving frame 36 in another direction (downward) along the y-axis direction. On the other hand, the second embodiment of the zoom lens is not provided with either a horizontal driving lever or a vertical driving lever which respectively corresponds to the horizontal driving lever 40 or the vertical driving lever 41, so that neither the horizontal moving frame 32 nor the vertical moving frame 36 is driven for image stabilization. The second embodiment of the zoom lens is provided with an x-axis stop pin (an element of a sub-positioning device/positioning member) 140 and a y-axis stop pin (positioning device/positioning member) 141 instead of the horizontal driving lever 40 and the vertical moving lever 41, respectively.

Each of the two stop pins 140 and 141 is formed as a cylindrical column member, the axis of which extends in a direction parallel to the photographing optical axis Z1. The x-axis stop pin 140 and the y-axis stop pin 141 are fixed to the housing 11 at two predetermined positions thereon, respectively. Similar to the operation pin 40*b* of the horizontal driving lever 40 in the previous embodiment of the zoom lens, the x-axis stop pin 140 comes in contact with the position restricting surface 32*e* to determine the photographing position of the horizontal moving frame 32 in the x-axis direction. The biasing force of the horizontal moving frame biasing spring 37 acts in a direction to bring the position restricting surface 32*e* into contact with the x-direction stop pin 140. The vertical moving frame 36 in the second embodiment of the zoom lens is provided with a position restricting projection 36*h* instead of the pressed pin 36*g* that is provided in the previous embodiment of the zoom lens, and the y-axis stop pin 141 comes in contact with the position restricting projection 36*h* to determine the photographing position of the vertical moving frame 36 in the y-axis direction in a manner similar to that in the previous embodiment of the zoom lens that uses the pressing inclined surface 41*b* of the vertical driving lever 41. The biasing force of the vertical moving frame biasing spring 39 acts in a direction to bring the position restricting projection 36*h* into contact with the y-direction stop pin 141.

Figure 26:
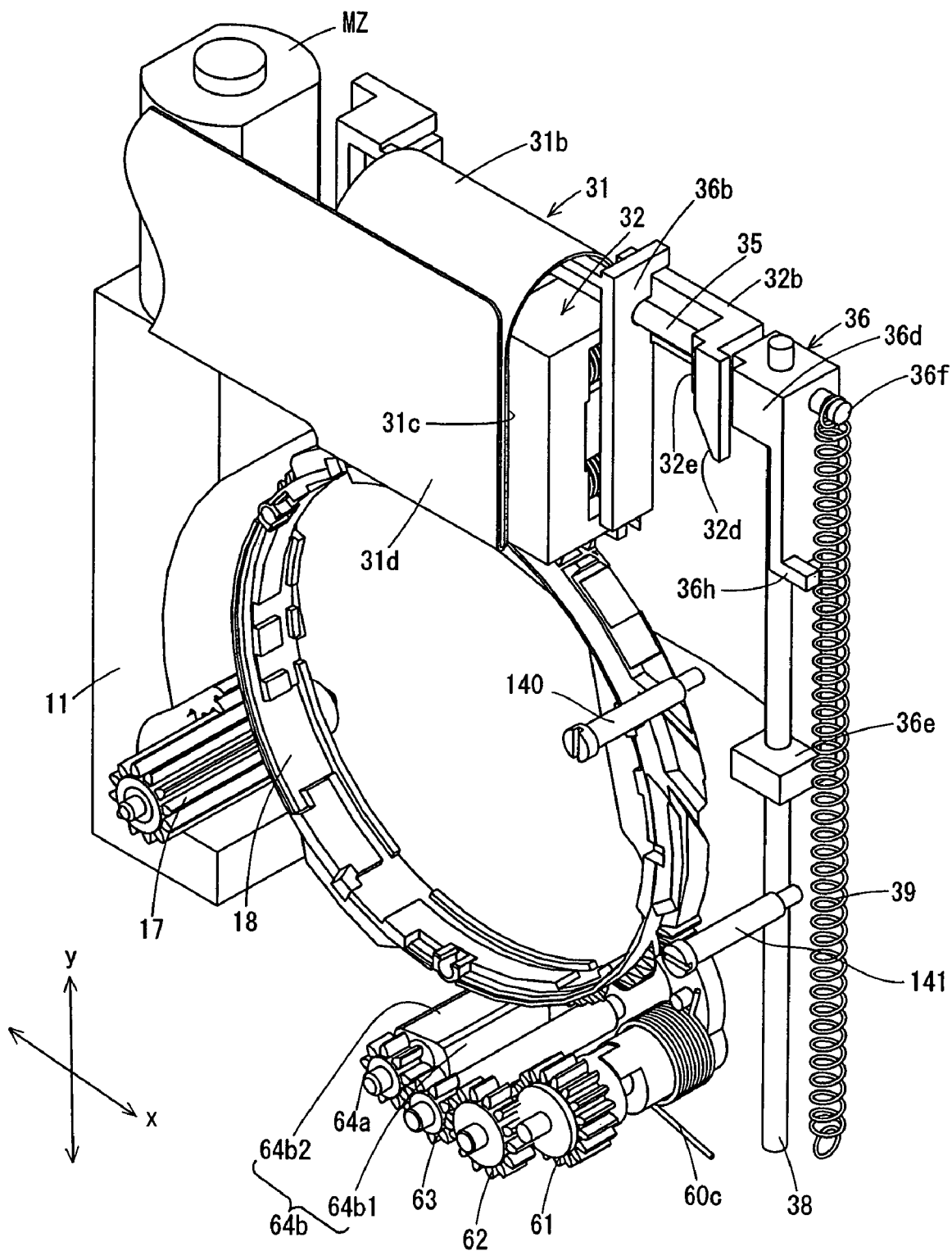
FIG. 26 is a front perspective view of the radially-retracting mechanism in the second embodiment of the zoom lens, illustrating the retracted state of a CCD holder in the retracted state of the zoom lens.
Figure 27:
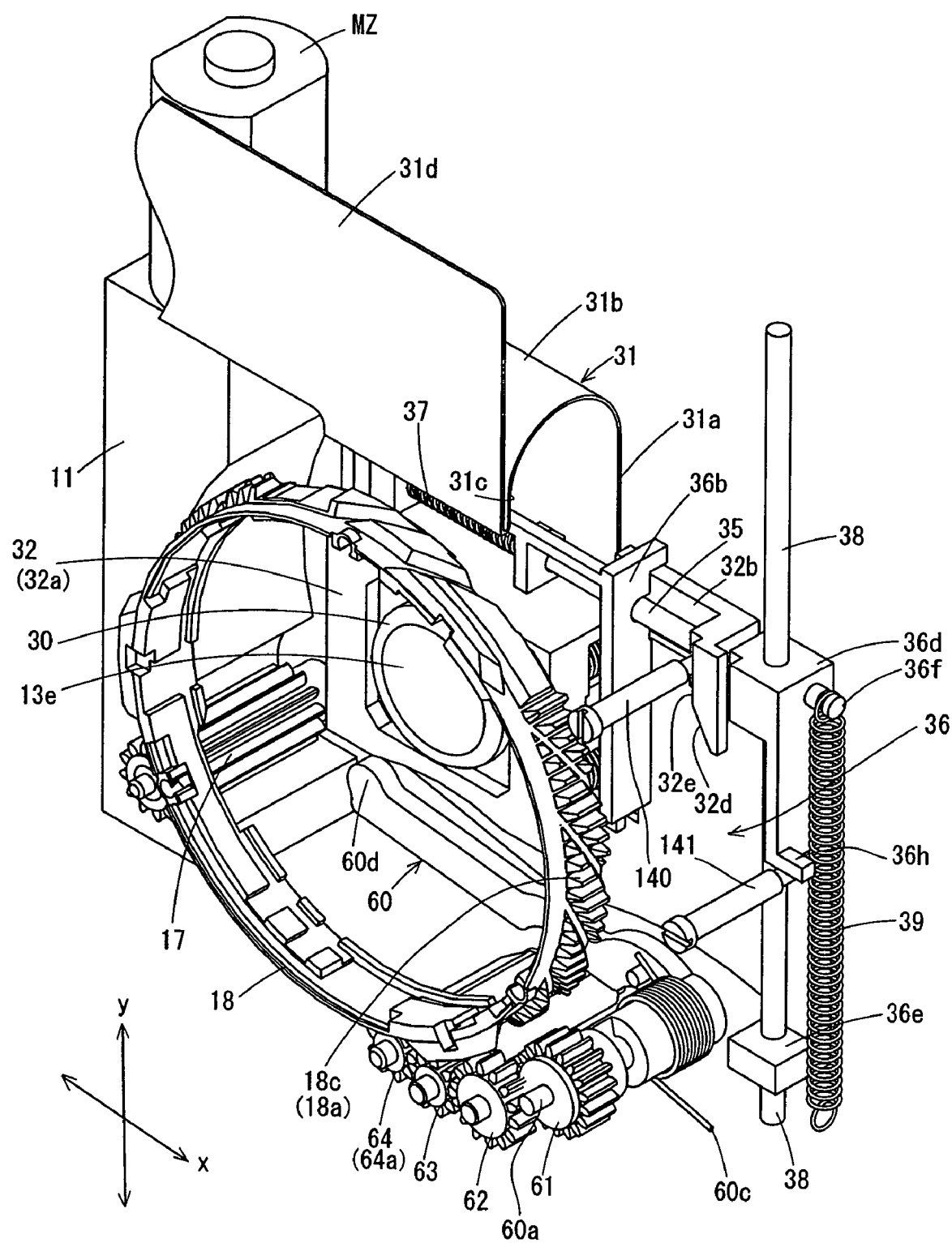
FIG. 27 is a front perspective view of the radially-retracting mechanism in the second embodiment of the zoom lens, illustrating the on-optical-axis advanced state of the CCD holder in a photographic state of the zoom lens.
Figure 28:
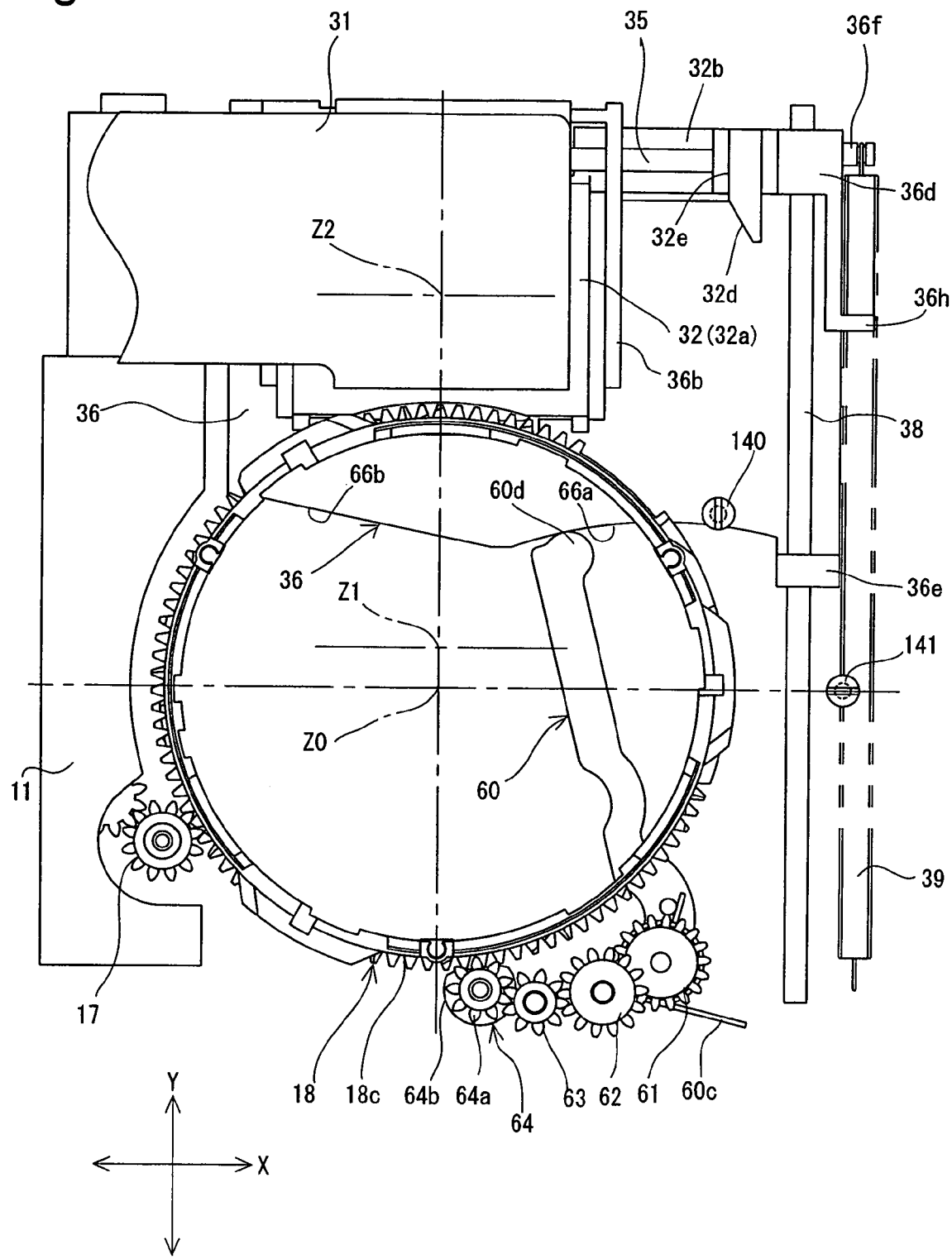
FIG. 28 is a front elevational view of the radially-retracting mechanism in the state shown in FIG. 26 as viewed from the front in the optical axis direction.
Figure 29:
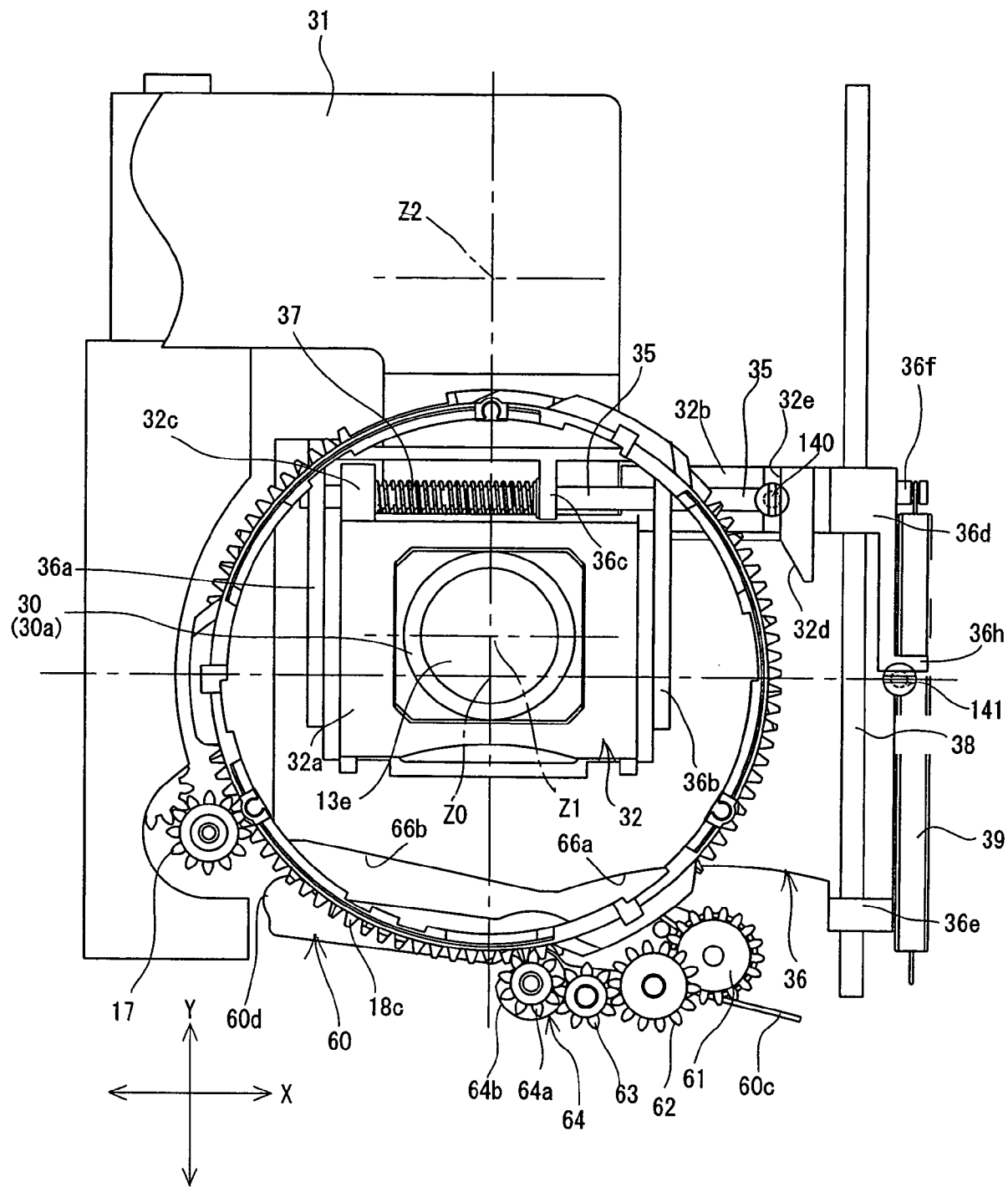
FIG. 29 is a front elevational view of the radially-retracting mechanism in the state shown in FIG. 27 as viewed from the front in the optical axis direction.

When the vertical moving frame 36 is retracted to the off-optical-axis retracted position Z2 by the retracting lever 60 as shown in FIGS. 26 and 28, the position restricting surface 32*e* is disengaged from the x-axis stop pin 140 while the position restricting projection 36*h* is disengaged from the y-axis stop pin 141. Thereafter, the vertical moving frame 36 moving down to the photographing optical axis Z1 by the biasing force of the vertical moving frame biasing spring 39 causes the position restricting projection 36*h* to come into contact with the y-axis stop pin 141 to thereby prevent a further downward movement of the vertical moving frame 36. In addition, immediately before this further downward movement of the vertical moving frame 36 is prevented by the y-axis stop pin 141, the x-direction stop pin 140 comes into contact with the inclined surface 32d and moves the horizontal moving frame 32 slightly in the x-direction (rightward as viewed in FIG. 28) against the biasing force of the horizontal moving frame biasing spring 37 so that the position restricting surface 32e comes in contact with the x-direction stop pin 140, which makes it possible to position the radially-retractable optical element unit, which is composed of the third lens group 13e, the low-pass filter 13f and the CCD 13g, at the photographing position thereof with a high degree of precision when the radially-retractable optical element unit is positioned on the photographing optical axis Z1, likewise with the case of the previous embodiment of the zoom lens.

Although the present invention has been described based on the above illustrated two embodiments, the present invention is not limited solely thereto. For instance, although each of the above described two embodiments is applied to a zoom lens, the present invention can be applied to an imaging device other than zoom lens as long as the imaging device operates at least between a photographic state and an accommodated state (retracted state).

In each of the above described two embodiments, the radially-retractable optical element unit that is composed of the third lens group 13e, the low-pass filter 13f and the CCD 13g, is driven linearly in the y-axis direction in a plane orthogonal to the photographing optical axis Z1 to change between a photographic state and a radially-retracted state, and is biased in the x-axis direction, which is perpendicular to the y-axis direction, for auxiliary positioning of the radially-retractable optical element unit. However, the retracting movement of the radially-retractable optical element unit is not limited solely to such a linear retracting movement. Moreover, the direction for auxiliary positioning of the radially-retractable optical element unit relative to this retracting driving direction can be at least a direction intersecting the retracting driving direction to produce an effect, and it is possible for the retracting driving direction and the auxiliary positioning direction to be perpendicular to each other.

Although the radially-retractable optical element unit that is composed of the third lens group 13e, the low-pass filter 13f and the CCD 13g, is radially retracted to the off-optical-axis retracted position Z2 when the zoom lens 10 is retracted as shown in FIG. 1, the elements of the radially-retractable optical element unit are not limited solely to such particular optical elements. Namely, the number of elements of the radially-retractable optical element unit and the type of optical elements thereof are optional.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging device comprising:
a radially-retracting device comprising a retractable moving frame for moving at least one radially-retractable optical element, serving as part of a photographing optical system, along a driving direction between a photographing position on a common optical axis of said photographing optical system and a radially-retracted position away from said common optical axis;
a biasing device for biasing said retractable moving frame in a direction toward said photographing position;
a positioning device which determines a limit of movement of said retractable moving frame in said biasing direction of said biasing device; and
a sub-positioning device comprising a sub-moving frame on which said at least one radially-retractable optical element is supported,
wherein said sub-moving frame is guidable by said retractable moving frame such that said sub-moving frame is movable in a direction intersecting said driving direction of said radially-retracting device, and
wherein said sub-positioning device is configured to restrict movement of said sub-moving frame in the direction intersecting the driving direction of said radially-retracting device.

2. The imaging device according to claim 1, wherein said radially-retracting device moves said radially-retractable optical element linearly along a linear driving direction in said plane that is orthogonal to said common optical axis, and
wherein said intersecting direction, in which said sub-positioning device positions said radially-retractable optical element at said photographing position, is substantially perpendicular to said linear driving direction.

3. The imaging device according to claim 1, wherein said radially-retracting device comprises a linear guide shaft extending in a direction perpendicular to said common optical axis,
wherein the retractable moving frame is supported by said linear guide shaft to be slidable thereon,
wherein said positioning device comprises a positioning member which comes in contact with said retractable moving frame to determine said limit of movement of said radially-retractable optical element which corresponds to said photographing position.

4. The imaging device according to claim 3, wherein said positioning member comprises a swingable lever pivoted about an axis parallel to said common optical axis.

5. The imaging device according to claim 3, wherein said positioning member comprises a stop pin parallel to said common optical axis.

6. The imaging device according to claim 3, wherein said biasing device comprises an extension coil spring which is extended in a direction parallel to said linear guide shaft.

7. The imaging device according to claim 3, wherein a contacting portion of said positioning member which comes in contact with said retractable moving frame comprises an inclined surface which is inclined to an axial direction of said linear guide shaft.

8. The imaging device according to claim 3, wherein
said sub-moving frame is linearly movable in a direction substantially perpendicular to the direction of movement of said retractable moving frame, the imaging device further comprising a second positioning member which is positioned off a moving path of said sub-moving frame when said radially-retractable optical element is positioned at said radially-retracted position, and is positioned on said moving path of said sub-moving frame to be in contact with said sub-moving frame when said radially-retractable optical element is positioned at said photographing position; and
a second biasing device, for biasing said sub-moving frame in a direction to come in contact with said second positioning member.

9. The imaging device according to claim 8, wherein said second positioning member comprises a swingable lever pivoted about said axis parallel to said common optical axis.

10. The imaging device according to claim 8, wherein said sub-moving frame comprises:
a positioning surface which is engaged with said second positioning member for positioning of said sub-moving frame when said radially-retractable optical element is positioned at said photographing position by said radially-retracting device; and an engageable guide surface which comes in contact with said second positioning member and moves said second positioning member in a direction opposite to a biasing direction of said second biasing device to engage said positioning surface and said second positioning member with each other when said radially-retractable optical element moves from said radially-retracted position to said photographing position by said radially-retracting device.

11. The imaging device according to claim 10, wherein said positioning surface is a flat surface parallel to said linear guide shaft.

12. The imaging device according to claim 10, wherein said engageable guide surface is communicatively connected to said positioning surface to be inclined relative to said positioning surface.

13. The imaging device according to claim 8, wherein said second biasing device comprises a spring installed between said retractable moving frame and said sub-moving frame.

14. The imaging device according to claim 13, wherein said spring comprises a compression coil spring.

15. The imaging device according to claim 1, wherein said radially-retractable optical element comprises an image sensor on which an object image is focused via said photographing optical system when said image sensor is positioned at said photographing position.

16. The imaging device according to claim 15, wherein said radially-retractable optical element further comprises a rearmost lens group of said photographing optical system in front of said image sensor.

17. The imaging device according to claim 1, wherein said imaging device comprises a retractable zoom lens which is retracted to reduce the length of said zoom lens when not in use.

18. An imaging device comprising:
a first drive device for moving at least one radially-retractable optical element, serving as part of a photographing optical system, along a driving direction between a photographing position on a common optical axis of said photographing optical system and a radially-retracted position away from said common optical axis; and
a second drive device for moving said radially-retractable optical element in a direction intersecting said driving direction of said first drive device in a plane orthogonal to said common optical axis,
wherein said first drive device comprises:
a first biasing device for biasing said radially-retractable optical element in a direction toward said photographing position; and
a first positioning member which determines a limit of movement of said radially-retractable optical element in said biasing direction of said first biasing device,
wherein said second drive device comprises:
a second positioning member which determines a limit of movement of said radially-retractable optical element in a direction of movement of said radially-retractable optical element by said second drive device; and
a second biasing device for biasing said radially-retractable optical element toward said limit of movement of said radially-retractable optical element in said direction of movement of said radially-retractable optical element by said second drive device,
wherein said second positioning member positions said radially-retractable optical element at said photographing position when said radially-retractable optical element is held at said photographing position by said first positioning member, and releases said positioning of said radially-retractable optical element when said radially-retractable optical element is disengaged from said first positioning member to be positioned at said radially-retracted position.

19. An imaging device comprising:
a radially-retracting device configured to move at least one radially-retractable optical element, serving as part of a photographing optical system, along a driving direction between a photographing position on a common optical axis of said photographing optical system and a radially-retracted position away from the common optical axis;
a biasing device configured to bias said radially-retractable optical element in a direction toward said photographing position;
a positioning device which determines a limit of movement of said radially-retractable optical element in the biasing direction of said biasing device; and
a sub-positioning device configured to position said radially-retractable optical element at the photographing position in a direction intersecting the driving direction of said radially-retracting device in a plane orthogonal to the common optical axis when said radially-retractable optical element is held at the photographing position by said positioning device, and for releasing the positioning of said radially-retractable optical element at the photographing position in the intersecting direction when said radially-retractable optical element is positioned at the radially-retracted position, wherein the intersecting direction, in which said sub-positioning device positions said radially-retractable optical element at the photographing position, is generally perpendicular to the driving direction.

20. The imaging device according to claim 19, wherein the a radially-retracting device is configured to linearly move at least one radially-retractable optical element along the driving direction between the photographing position on the common optical axis of said photographing optical system and the radially-retracted position away from the common optical axis.

* * * * *